(12) United States Patent
Shigenari et al.

(10) Patent No.: US 12,109,767 B2
(45) Date of Patent: Oct. 8, 2024

(54) FRP CONTINUOUS MOLDING APPARATUS AND FRP CONTINUOUS MOLDING METHOD

(71) Applicant: IHI AEROSPACE CO., LTD., Tokyo (JP)

(72) Inventors: Yu Shigenari, Tokyo (JP); Takashi Harada, Tokyo (JP); Toyoharu Akimoto, Tokyo (JP)

(73) Assignee: IHI AEROSPACE CO., LTD., Tokyo (JP)

( * ) Notice: Subject to any disclaimer, the term of this patent is extended or adjusted under 35 U.S.C. 154(b) by 472 days.

(21) Appl. No.: 17/296,599

(22) PCT Filed: Mar. 8, 2019

(86) PCT No.: PCT/JP2019/009487
§ 371 (c)(1),
(2) Date: May 25, 2021

(87) PCT Pub. No.: WO2020/136926
PCT Pub. Date: Jul. 2, 2020

(65) Prior Publication Data
US 2022/0001630 A1    Jan. 6, 2022

(30) Foreign Application Priority Data
Dec. 28, 2018   (JP) ................................ 2018-247643

(51) Int. Cl.
*B29C 70/52*   (2006.01)
*B29K 101/12*   (2006.01)

(52) U.S. Cl.
CPC .......... *B29C 70/528* (2013.01); *B29C 70/526* (2013.01); *B29K 2101/12* (2013.01)

(58) Field of Classification Search
CPC ..... B29C 70/528; B29C 70/526; B29C 70/50; B29C 70/504; B29C 70/202;
(Continued)

(56) References Cited

U.S. PATENT DOCUMENTS 4,151,031 A * 4/1979 Goad ...................... B29C 65/02
156/499
8,986,583 B2 * 3/2015 Bechtold ................. B29C 70/16
156/166
(Continued)

FOREIGN PATENT DOCUMENTS

JP    63109039 A  *  5/1988  ........... B29C 53/043
JP    05-278126 A     10/1993
(Continued)

OTHER PUBLICATIONS

Machine translation of JP 63109039 date unknown.*
(Continued)

*Primary Examiner* — John L Goff, II
(74) *Attorney, Agent, or Firm* — Volpe Koenig

(57) ABSTRACT

An FRP continuous molding apparatus continuously molds an FRP from a layered sheet that includes prepreg sheets layered over each other. The prepreg sheets each include thermoplastic resin and reinforcement fibers, and differ from each other in fiber orientation. The FRP continuous molding apparatus includes: sheet feeding devices continuously feeding the layered sheets in a feeding direction; a layering device layering, over each other, the layered sheets fed from the sheet feeding devices, and thereby forming a sheet layered body; and a shaping mechanism molding the sheet layered body into an FRP while the sheet layered body is being transferred in the feeding direction. The FRP has a
(Continued)

cross section that is a target shape. The sheet layered body includes the reinforcement fibers whose fiber orientation is the feeding direction.

15 Claims, 26 Drawing Sheets

(58) Field of Classification Search
CPC ... B29C 70/085; B29C 70/205; B29C 70/222; B29C 70/56; B29K 2101/12
See application file for complete search history.

(56) References Cited

U.S. PATENT DOCUMENTS

| 2002/0000295 | A1 | 1/2002 | Kasai et al. |
| 2013/0134621 | A1 | 5/2013 | Tsotsis et al. |
| 2020/0391453 | A1 | 12/2020 | Morishima et al. |

FOREIGN PATENT DOCUMENTS

| JP | 08-108483 A | 4/1996 |
| JP | 2001-328130 A | 11/2001 |
| JP | 2011-056816 A | 3/2011 |
| JP | 2013-111982 A | 6/2013 |
| JP | 2013-132890 A | 7/2013 |
| RU | 2317205 C2 | 2/2008 |
| RU | 2535711 C1 | 12/2014 |
| WO | 2018/012269 A1 | 1/2018 |

OTHER PUBLICATIONS

Chinese Office Action issued on Mar. 13, 2023 for Chinese Patent Application No. 201980084949.5.
International Preliminary Report on Patentability issued Jun. 16, 2021 for PCT International Application No. PCT/JP2019/009487.
Extended European Search Report dated Jan. 20, 2022 for European Patent Application No. 19904623.6.
Russian Office Action issued on Feb. 22, 2022 for Russian Patent Application No. 2021118534.
Russian Search Report issued on Feb. 22, 2022 for Russian Patent Application No. 2021118534.
Canadian Office Action issued on Sep. 21, 2022 for Canadian Patent Application No. 3122423.
Chinese Office Action issued on Jul. 19, 2022 for Chinese Patent Application No. 201980084949.5.
International Search Report, PCT/JP2019/009487, Apr. 9, 2019, 5 pgs. (English and Japanese languages).
Written Opinion of the International Search Authority, PCT/JP2019/009487, Apr. 9, 2019, 5 pgs. (Japanese language).
First Office Action, JP 2019-529283, Jun. 11, 2020, 5 pgs. (Japanese and English languages).
Second Office Action, JP 2019-529283, Nov. 10, 2020, 8 pgs. (Japanese and English languages).

\* cited by examiner

FEEDING DIRECTION

FEEDING DIRECTION

FEEDING DIRECTION

FRP CONTINUOUS MOLDING APPARATUS AND FRP CONTINUOUS MOLDING METHOD

TECHNICAL FIELD

The present invention relates to an FRP continuous molding apparatus that continuously molds a fiber-reinforced plastic (FRP).

BACKGROUND ART

An FRP is conventionally molded as follows. A plurality of prepreg sheets are prepared. The prepreg is a molding material including reinforcement fibers that have been impregnated with thermosetting resin and heated or dried so as to be in a semi-cured state. The prepreg sheet is a sheet-shaped prepreg. A plurality of the prepared prepreg sheets are layered over each other. The layered prepreg sheets are molded, with a heated mold, into a predetermined shape, while the thermosetting resin in the prepreg sheets is made cured. Thus, an FRP having the predetermined shape is molded from a plurality of the prepreg sheets (Patent Literature 1, for example).

CITATION LIST

Patent Literatures

Patent Literature 1: Japanese Patent Application Laid-open Publication No. 2001-328130

SUMMARY OF INVENTION

Technical Problem

The above-described molding of FRP uses prepreg sheets that each include reinforcement fibers impregnated with thermosetting resin.

Meanwhile, an FRP is desirably molded using prepreg sheets that each include the reinforcement fibers impregnated with thermoplastic resin instead of thermosetting resin. The thermoplastic resin does not cause a chemical reaction even when heated, and can be easily softened by heating and solidified by cooling, differently from thermosetting resin. Accordingly, prepreg sheets are conceivably molded while being transferred, in a state heated to a temperature suitable for the molding, for example. Expectedly, an FRP can be thereby molded in short time, using prepreg sheets made of thermoplastic resin, and as a result, mass production of FRP is facilitated.

In view of the above, an object of the present invention is to provide an apparatus and a method for continuously producing an FRP from prepreg sheets made of thermoplastic resin.

Solution to Problem

In order to accomplish the above-described object, an FRP continuous molding apparatus according to the present invention continuously molds an FRP from a layered sheet including a plurality of prepreg sheets layered over each other, wherein the plurality of prepreg sheets each include thermoplastic resin and reinforcement fibers and differ from each other in fiber orientation, the FRP continuous molding apparatus including:

a plurality of sheet feeding devices that continuously feed a plurality of the layered sheets in a feeding direction;

a layering device that layers, over each other, the plurality of the layered sheets fed from the plurality of sheet feeding devices, and thereby forms a sheet layered body; and a shaping mechanism that molds the sheet layered body into an FRP while the sheet layered body is being transferred in the feeding direction, the FRP having a cross section that is a target shape, wherein the sheet layered body includes the reinforcement fibers whose fiber orientation is the feeding direction.

In order to accomplish the above-described object, an FRP continuous molding method according to the present invention continuously molds an FRP from a layered sheet including a plurality of prepreg sheets layered over each other, wherein the plurality of prepreg sheets each include thermoplastic resin and reinforcement fibers and differ from each other in fiber orientation, the FRP continuous molding method including:

continuously feeding a plurality of the layered sheets in a feeding direction;

layering, over each other, the plurality of the fed layered sheets, and thereby forming a sheet layered body;

molding the sheet layered body into an FRP while transferring the sheet layered body in the feeding direction, the FRP having a cross section that is a target shape, wherein the sheet layered body includes the reinforcement fibers whose fiber orientation is the feeding direction.

Advantageous Effects of Invention

According to the present invention, the sheet layered body is molded while being transferred in the feeding direction. Thus, large tension acts on the sheet layered body in the feeding direction. In this regard, according to the present invention, the sheet layered body includes reinforcement fibers whose fiber orientation is the feeding direction so that the sheet layered body is reinforced by the reinforcement fibers. For this reason, even when large tension acts on the sheet layered body in the feeding direction during molding of the sheet layered body, the sheet layered body can be prevented from being damaged. Thus, the FRP can be continuously produced without damaging of the sheet layered body. Further, using the prepreg sheets including the thermoplastic resin enables the FRP to be molded in short time. This results in facilitating mass production of a long FRP having a constant cross-sectional shape.

DESCRIPTION OF EMBODIMENTS

The following describes embodiments of the present invention with reference to the drawings. The same reference sign is allocated to each of the corresponding parts in each of the drawings, and its duplicate description is omitted.

Figure 1:
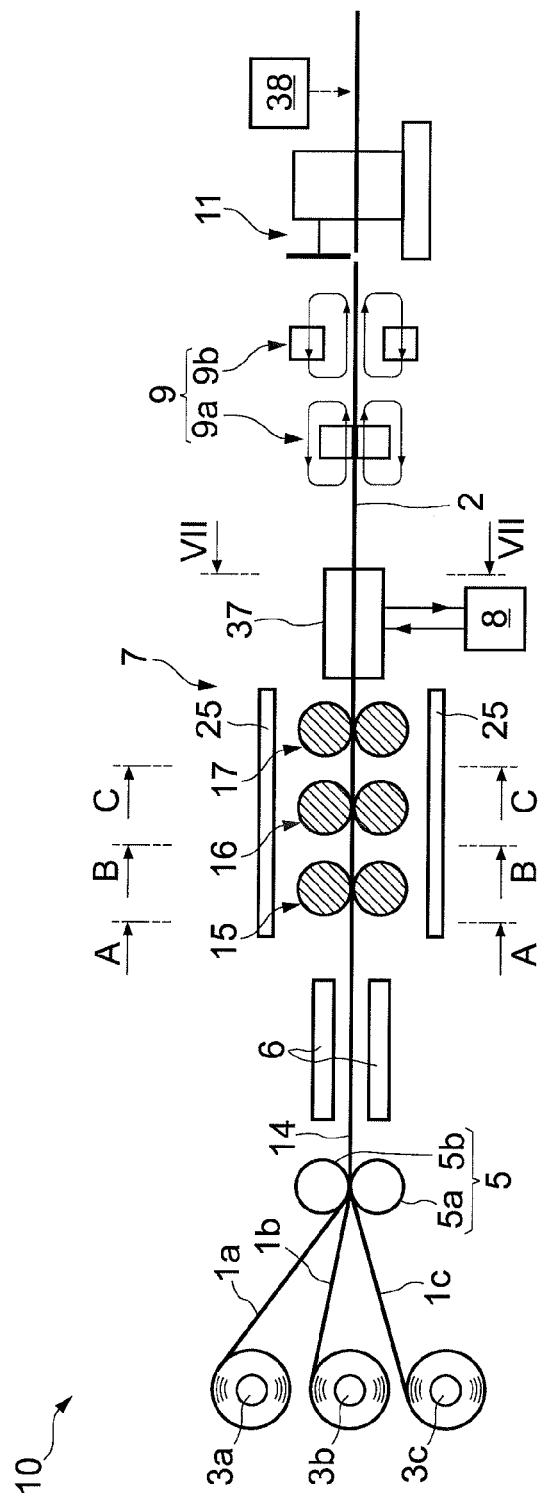
FIG. 1 is a schematic view illustrating an entire configuration of an FRP continuous molding apparatus according to a first embodiment of the present invention.

FIG. 1 is a schematic view illustrating an entire configuration of an FRP continuous molding apparatus 10 according to a first embodiment of the present invention. The FRP continuous molding apparatus 10 continuously molds fiber-reinforced plastic (FRP) 2 from layered sheets. The layered sheets each includes a plurality of prepreg sheets each including thermoplastic resin and reinforcement fibers and layered over each other. The prepreg sheets of each of the layered sheets differ from each other in a fiber orientation. The following description assumes that a plurality of the layered sheets are three layered sheets 1a, 1b, and 1c. However, s plurality of the layered sheets may be two layered sheets, or four or more layered sheets. Each of the prepreg sheets that constitute each of the layered sheets 1a, 1b, and 1c is formed of thermoplastic resin and reinforcement fibers. The FRP continuous molding apparatus 10 includes sheet feeding devices 3a, 3b, and 3c, a layering device 5, a heating device 6, a shaping mechanism 7, a cooling device 8, a pulling device 9, a cutting device 11, and a non-destructive inspection device 38.

A plurality of the sheet feeding devices 3a, 3b, and 3c continuously feed the layered sheets 1a, 1b, and 1c, respectively, in a feeding direction. In the present application, the feeding direction is a direction (the right direction in FIG. 1) in which a plurality of the layered sheets 1a, 1b, and 1c (and a sheet layered body 14, an FRP 2, a combined body 57, and an FRP 58 described below) are continuously transferred. Each of the sheet feeding devices 3a, 3b, and 3c may be a reel on which the corresponding layered sheet 1a, 1b, or 1c is wound. Torque is generated in each of the reels 3a, 3b, and 3c in a direction of winding back the layered sheets 1a, 1b, or 1c. For this reason, the layered sheets 1a, 1b, and 1c are continuously fed out by the below-described pulling device 9 while receiving backward tension.

Figure 2A:
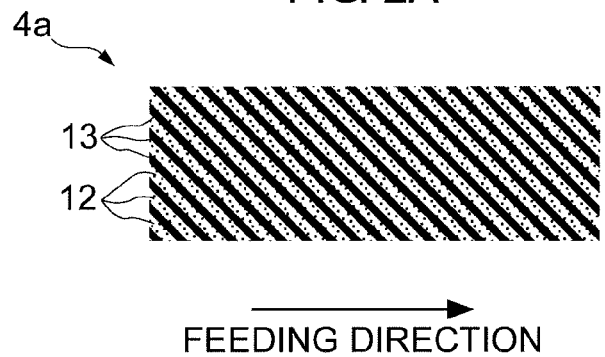
FIG. 2A to FIG. 2C are schematic enlarged views of prepreg sheets viewed from their thickness directions.
Figure 2B:
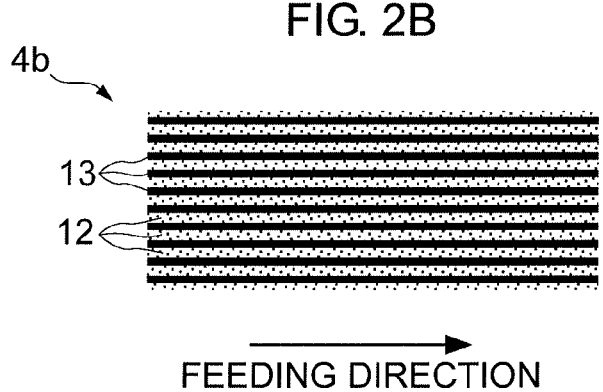
Figure 2C:
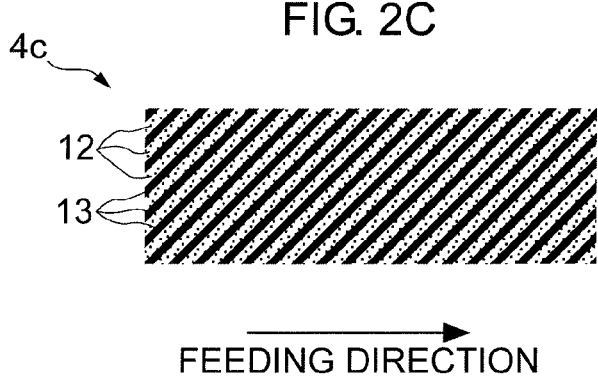

FIG. 2A to FIG. 2C illustrate an example of the prepreg sheets constituting one layered sheet (e.g., the layered sheet 1a or 1b). FIG. 2A to FIG. 2C are schematic enlarged views of the prepreg sheets 4a, 4b, and 4c viewed from their thickness directions. In the present embodiment, each of the prepreg sheets 4a, 4b, and 4c is a sheet-shaped (e.g., tape-shaped) molding material including thermoplastic resin 12 and reinforcement fibers 13, as illustrated in FIG. 2A to FIG. 2C, for example. The prepreg sheets 4a, 4b, and 4c may each include the reinforcement fibers 13 that have been impregnated with the thermoplastic resin 12. Here, the reinforcement fibers 13 may be carbon fibers, but may be other fibers.

According to the present embodiment, at least one of a plurality of the layered sheets 1a, 1b, and 1c includes the prepreg sheet whose fiber orientation is the feeding direction. The fiber orientation is the axial direction of each of the reinforcement fibers constituting the reinforcement fibers 13. In one example, the layered sheet 1b includes, as the outermost layers, the prepreg sheets 4b whose fiber orientations are each the feeding direction. The layered sheet 1b is sandwiched between the different layered sheets 1a and 1c, in the below-described layering device 5. When at least one of the layered sheets 1a, 1b, and 1c includes the prepreg sheet whose fiber orientation is the feeding direction, fiber orientations of the outermost layers in each of the layered sheet 1a, 1b, and 1c do not need to be the feeding direction.

The prepreg sheet whose fiber orientation is the feeding direction may be a prepreg sheet including the reinforcement fibers 13 that are oriented in the feeding direction and that constitute a predetermined weight or volume percentage (e.g., 50%) or more of all the reinforcement fibers 13 in this prepreg sheet, in an example. The prepreg sheet 4b whose fiber orientation is the feeding direction may be a unidirectional (UD) prepreg sheet in which the reinforcement fibers 13 (e.g., all the reinforcement fibers 13) are entirely oriented in the feeding direction as illustrated in FIG. 2B, in one example.

The layered sheets 1a, 1b, and 1c may each include the prepreg sheet (e.g., the prepreg sheets 4a or 4c) whose fiber orientation is one or more intersection directions intersecting with the feeding direction. In this case, each of the layered sheets 1a, 1b, and 1c may be a layered sheet including the reinforcement fibers 13 that are oriented in the one or more intersection directions and whose quantity is smaller than a predetermined weight or volume percentage (e.g., 50%) of all the reinforcement fibers 13 in this layered sheet. In other words, each of the layered sheet 1a, 1b, and 1c may be a layered sheet including the reinforcement fibers 13 that are oriented in the feeding direction and that constitutes the predetermined weight or volume percentage (e.g., 50%) or more of all the reinforcement fibers 13 in this layered sheet. The prepreg sheet 4a and 4b whose fiber orientations are each the one or more intersection directions may be each a unidirectional (UD) prepreg sheet in which the reinforcement fibers 13 (e.g., all the reinforcement fibers 13) are entirely oriented in the one intersection direction, as illustrated in FIG. 2A and FIG. 2C. Examples of the prepreg sheet whose fiber orientation is the one or more intersection directions include the prepreg sheet 4a of FIG. 2A in which the one or more intersection directions are inclined (e.g., by 45 degrees) to one side from the feeding direction, and the prepreg sheet 4c of FIG. 2C in which the one or more intersection directions are inclined (e.g., by 45 degrees) to the other side from the feeding direction.

The layering device 5 layers, over each other in their thickness direction, a plurality of the layered sheets 1a, 1b, and 1c continuously fed from a plurality of the sheet feeding devices 3a, 3b, and 3c, respectively. The layering device 5 thereby forms a sheet layered body 14. According to the present embodiment, the sheet layered body 14 includes the reinforcement fibers oriented in the feeding direction. The sheet layered body 14 includes the reinforcement fibers that are oriented in the feeding direction and that constitute a predetermined percentage or more of all the reinforcement fibers in this sheet layered body 14. This predetermined percentage is 25% or 50%, for example, but is not limited to these, and depends on strength and a material of the reinforcement fibers. In other words, this predetermined percentage is determined as a value enabling reinforcement such that the sheet layered body 14 is not damaged (e.g., not broken) in the feeding direction by being molded by the below-described shaping mechanism 7 (the molding units 15 to 17, the below-described molding units 65 to 67, and the below-described mold apparatuses 68 in the case of the below-described second embodiment).

The layering device 5 may form the sheet layered body 14 that includes the layered sheet 1b including the outermost layers whose fiber orientations are each the feeding direction, and that includes the different layered sheets 1a and 1c sandwiching the layered sheet 1b and each including the outermost layers whose fiber orientations are not the feeding direction. In other words, fiber orientations of the prepreg sheets at the outermost layers (the outermost layers on both sides opposite to each other) of the sheet layered body 14 may be the above-described one or more intersection directions.

The layering device 5 may include a pair of layering rollers 5a and 5b that sandwich a plurality of the layered sheets 1a, 1b, and 1c in their thickness direction so as to form the sheet layered body 14, as illustrated in FIG. 1. A pair of the layering rollers 5a and 5b may be rotationally driven so as to transfer the sheet layered body 14 in the feeding direction, or may simply be each freely rotatable around its own central axis. A pressing mechanism and a heating mechanism may be provided or absent in the layering device 5.

The heating device 6 heats the sheet layered body 14 continuously fed from the layering device 5, and thereby softens the sheet layered body 14. This enables the below-described shaping mechanism 7 to easily mold the sheet layered body 14. The heating device 6 may be a heater, for example.

The shaping mechanism 7 molds a cross-sectional shape of the sheet layered body 14 into a target shape while transferring, in feeding direction, the sheet layered body 14 continuously fed from the heating device 6.

The shaping mechanism 7 includes molding surfaces that form a passage region when viewed in the feeding direction. The sheet layered body 14 passes though the passage region. As a position shifts to a more downstream side, a shape of the passage region viewed in the feeding direction approaches the target shape so as to deviate from a cross-sectional shape of the sheet layered body 14 that is yet to enter the shaping mechanism 7. For example, the shape of the passage region viewed in the feeding direction is, at the most upstream position in the feeding direction, the same as or close to a cross-sectional shape of the sheet layered body 14 immediately before a position of entry into the shaping mechanism 7, and approaches the target shape so as to deviate from this cross-sectional shape, as a position shifts to a more downstream side.

A plurality of the layered sheets 1a, 1b, and 1c constituting the sheet layered body 14 that has been molded by the shaping mechanism 7 are in a state of being fused with each other by being heated. This heating may be achieved by any or all of heat from the heating device 6, heat from the below-described molding rollers, and heat from a heating furnace or the like. In the following, the sheet layered body 14 that has been molded by the shaping mechanism 7 is referred to as an FRP 2.

The shaping mechanism 7 in the present embodiment includes a plurality of molding units 15, 16, and 17 arranged at a plurality of respective positions in the feeding direction, and includes a mold apparatus 37, as illustrated in FIG. 1. The molding units 15, 16, and 17 each include a plurality of molding rollers that sandwich the sheet layered body 14. A plurality of the molding rollers may compress the sheet layered body 14. The molding rollers each includes the above-described molding surface that forms the above-described passage region. Each of the molding rollers constituting each of the molding units 15, 16, and 17 is rotationally driven or simply freely rotatable around its own central axis. The below-described ball rollers and division rollers are simply freely rotatable.

The number of the molding units 15, 16, and 17 is three in the example of FIG. 1, but may be one, two, or four or more. A plurality of the molding rollers may include a molding roller including the molding surface and including a heater or an induction heating coil that is arranged inside the molding roller and that heats the molding surface. The heated molding surface molds the sheet layered body 14 while softening the sheet layered body 14. An incorporated heating mechanism such as the heater may be absent in the molding roller, and a heating device 25 (heating furnace or the like) outside the molding rollers may heat the sheet layered body 14. The above-described heating device 6 constitutes a heating device heating the sheet layered body 14 that is yet to be molded by the shaping mechanism 7. The heater or the induction heating coil inside the molding roller, or the heating device 25 outside the molding rollers constitutes a heating device that heats the sheet layered body 14 that is being molded by the shaping mechanism 7.

The following describes configuration examples of the above-described molding units 15, 16, and 17 and a plurality of their molding rollers in the case of respective target shapes, with reference to FIG. 3A to FIG. 6E.

<In Case of Target Shape as Rectangular Shape>

Figure 3A:
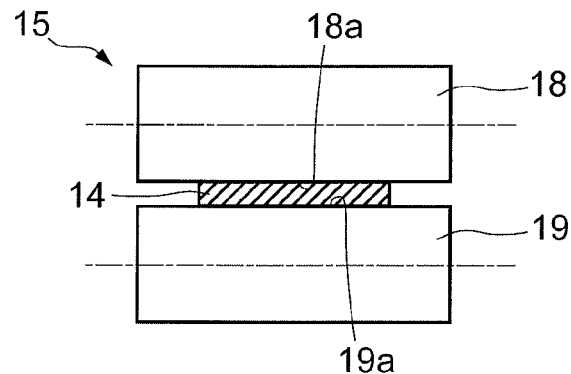
FIG. 3A to FIG. 3C illustrate configuration examples of molding units for a rectangular shape.
Figure 3B:
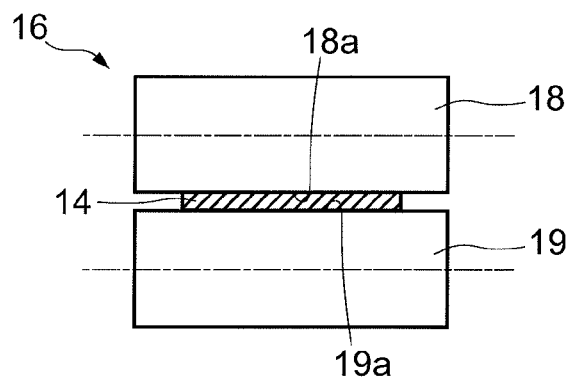
Figure 3C:
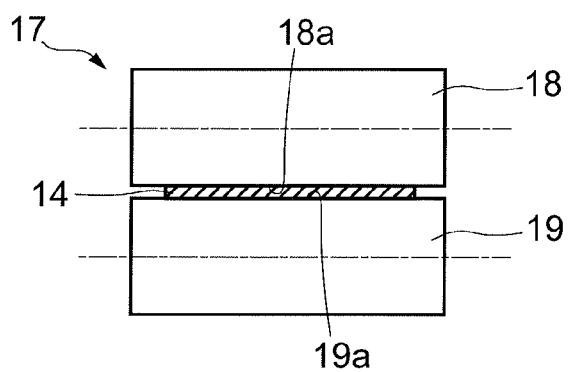

FIG. 3A to FIG. 3C illustrate the configuration examples of the molding units 15, 16, and 17 when the target shape is rectangular. FIG. 3A to FIG. 3C are the A-A arrow view, the B-B arrow view, and the C-C arrow view in FIG. 1, respectively. In the configuration examples of FIG. 3A to FIG. 3C, the molding units 15 to 17 each include a pair of molding rollers 18 and 19 sandwiching the sheet layered body 14. The molding rollers 18 and 19 may be each formed in a cylindrical shape.

A pair of the molding rollers 18 and 19 each include a molding surface 18a or 19a forming the above-described passage region. The passage region is a region sandwiched by a pair of the molding rollers 18 and 19. The passage region becomes narrower in a separation direction of a pair of the molding rollers 18 and 19 and approaches the rectangular target shape as the passage region shifts to the molding unit on a more downstream side in the feeding direction. In FIG. 3A and other drawings, the one-dot chain lines represent the central axes of respective rollers (the molding rollers 18 and 19 in FIG. 3A). The sheet layered body 14 passes through the molding rollers 18 and 19 (i.e., the above-described passage region) in a plurality of the molding units 15, 16, and 17, and is thereby gradually reduced in thickness. Thus, the sheet layered body 14 is molded so as to have a cross-sectional shape (rectangular shape) close to the target shape.

<In Case of Target Shape as L-Shape>

Figure 4A:
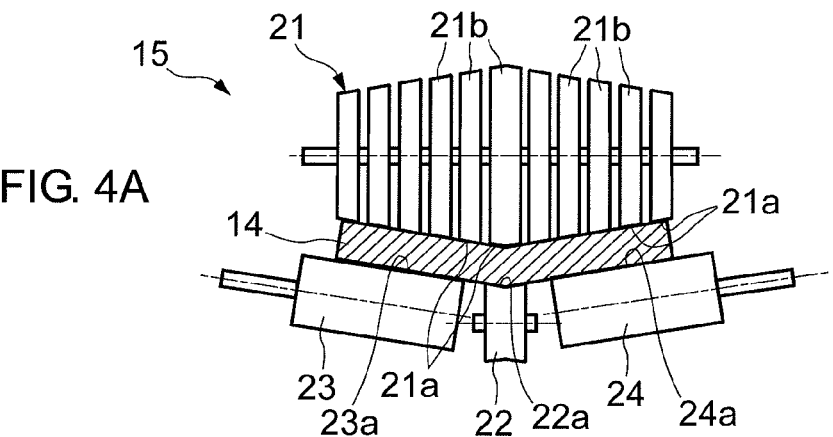
FIG. 4A to FIG. 4C illustrate configuration examples of molding units for an L-shape.
Figure 4B:
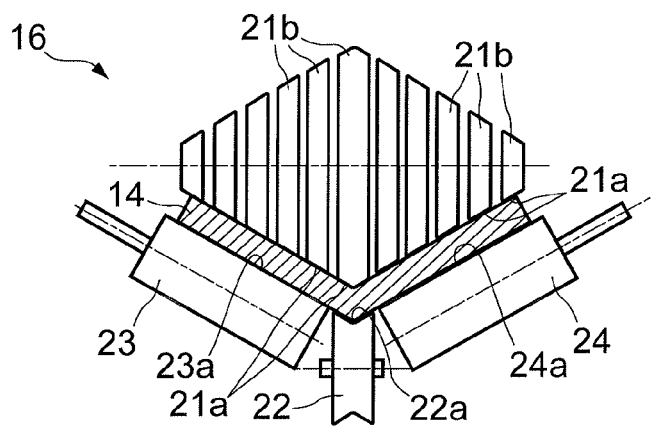
Figure 4C:
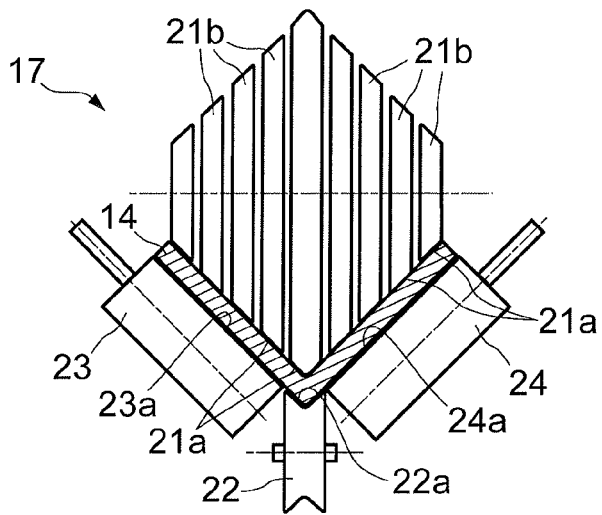

FIG. 4A to FIG. 4C illustrate the configuration examples of the molding units 15, 16, and 17 when the target shape is an L-shape. FIG. 4A to FIG. 4C are the A-A arrow view, the B-B arrow view, and the C-C arrow view in FIG. 1, respectively.

In the configuration examples of FIG. 4A to FIG. 4C, the molding unit 15 to 17 each include molding rollers 21 to 24. The sheet layered body 14 is sandwiched between the molding roller 21 and the molding rollers 22 to 24 and is thereby molded. The molding rollers 21, 22, 23, and 24 respectively includes molding surfaces 21a, 22a, 23a, and 24a forming the above-described passage region. The passage region is a region sandwiched by a plurality of the molding rollers 21, 22, 23, and 24. The passage region approaches the L-shape, i.e., the target shape as the passage region shifts to the molding unit on a more downstream side in the feeding direction. In other words, the sheet layered body 14 having a rectangular cross section is gradually bent by the molding units 15 to 17 and is thereby molded so as to have a cross-sectional shape (L-shape) close to the target shape.

In each of the molding units 15 to 17, the molding roller 21 is arranged on a side to which the sheet layered body 14 is bent as described above, and the molding rollers 22, 23, and 24 are arranged on a side opposite to the molding roller 21 with respect to the sheet layered body 14.

The central axis of the molding roller 21 is oriented in a width direction of the sheet layered body 14. The width direction of the sheet layered body 14 is a direction perpendicular to the feeding direction, and is a direction (e.g., the left-right direction in FIG. 4A to FIG. 4C) from one end surface to the other end surface in the sheet layered body 14 immediately before the shaping mechanism 7 (the same applies to the following). The molding roller 21 includes a plurality of division rollers 21b. These division rollers 21b have central axes aligned with the single central axis of the molding roller 21. A plurality of the division rollers 21b are provided so as to be freely rotatable around the single central axis independently of each other. The division roller 21b arranged more apart from the center of the molding roller 21 in the direction of the single central axis has a smaller outer diameter. The molding roller 21 is constituted by a plurality of the division rollers 21b that rotate independently of each other, thereby suppressing a difference in rotational speed of an outer surface of the roller caused by a difference in roller diameter. Accordingly, irregularity of a surface shape of the FRP 2 can be suppressed.

The molding roller 22 is arranged at the width-direction center of the sheet layered body 14. In other words, the molding roller 22 is arranged at a bent portion in a cross section of the sheet layered body 14. The molding roller 22 is freely rotatable around its own central axis oriented in the width direction of the sheet layered body 14. The molding rollers 23 and 24 are arranged on both sides of the molding roller 22 in the width direction of the sheet layered body 14, and have their central axes inclined from the width direction.

<In Case of Target Shape as U-Shape>

Figure 5A:
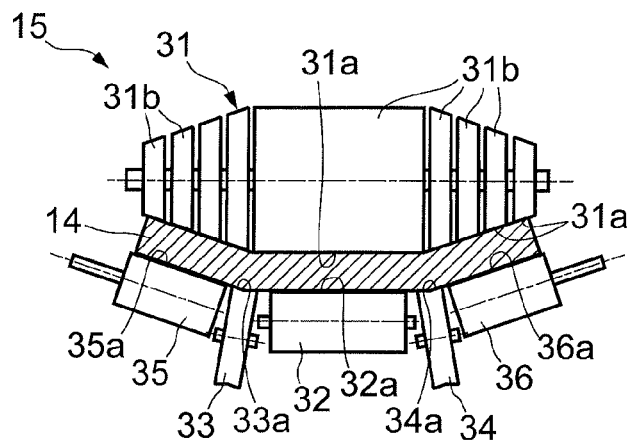
FIG. 5A to FIG. 5C illustrate configuration examples of molding units for a U-shape.
Figure 5B:
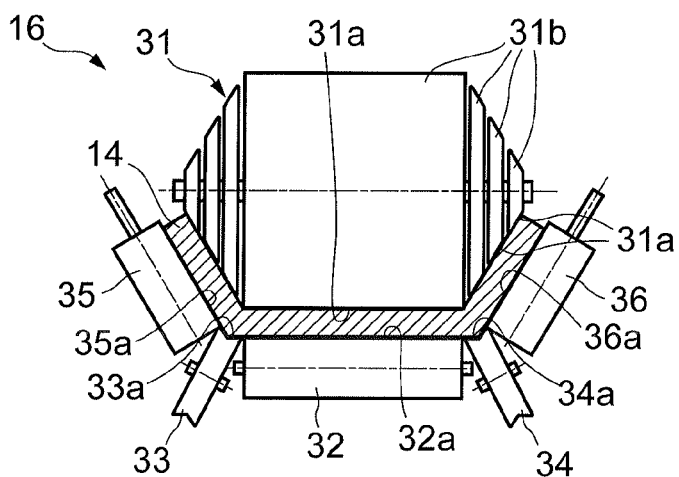
Figure 5C:
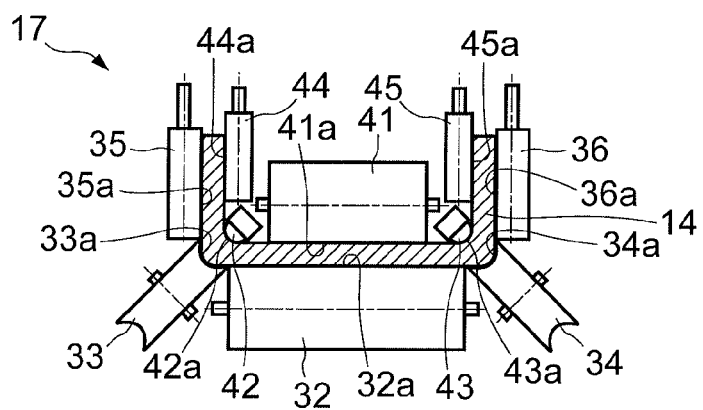

FIG. 5A to FIG. 5C illustrates the configuration examples of the molding units 15, 16, and 17 when the target shape is a U-shape. FIG. 5A to FIG. 5C are the A-A arrow view, the B-B arrow view, and the C-C arrow view in FIG. 1, respectively.

In the configuration examples of FIG. 5A to FIG. 5C, the molding units 15 and 16 each include molding rollers 31 to 36. The molding unit 17 includes molding rollers 32 to 36 and molding rollers 41 to 45. In the molding units 15 and 16, the sheet layered body 14 is sandwiched between the molding roller 31 and the molding rollers 32 to 36. In the molding unit 17, the sheet layered body 14 is sandwiched between the molding rollers 41 to 45 and the molding rollers 32 to 36. Thus, the sheet layered body 14 is molded. The molding rollers 31 to 36 and 41 to 45 respectively includes molding surfaces 31a to 36a and 41a to 45a forming the above-described passage region. The passage region is a region sandwiched between the molding roller 31 and the molding rollers 32 to 36, and between the molding rollers 41 to 45 and the molding rollers 32 to 36. This region approaches the U-shape, i.e., the target shape as the region shifts to the molding unit on a more downstream side in the feeding direction. In other words, the sheet layered body 14 having a rectangular cross section is gradually bent by the molding units 15 to 17 and is thereby molded so as to have a cross-sectional shape (U-shape) close to the target shape.

In each of the molding units 15 and 16, the molding roller 31 is positioned on a side (hereinafter, referred to also as one side) to which the sheet layered body 14 is bent as described above, and includes a plurality of dividing rollers 31b. These division rollers 31b include the central axes that are aligned with the single central axis of the molding roller 31 and that are oriented in the width direction of the sheet layered body 14. A plurality of the dividing rollers 31b are provided so as to be freely rotatable around the single central axis. The division roller 31b positioned at the center of the molding roller 31 in the direction of the single central axial has a cylindrical shape. The other division rollers 31b each have a truncated-cone shape. The division roller 31b arranged more apart from the center of the molding roller 31 in the direction of the single central axis has a smaller outer diameter. The molding roller 31 is constituted by a plurality of the division rollers 31b that rotate independently of each other. This can suppress a difference in rotational speed of an outer surface of the roller caused by a difference in roller diameter. Accordingly, irregularity of a surface shape of the sheet layered body 14 can be suppressed.

In each of the molding units 15 and 16, the molding rollers 32 to 36 are positioned on a side opposite with respect to the sheet layered body 14. The molding roller 32 is arranged at the center portion of the sheet layered body 14 in the width direction, and has a central axis oriented in the width direction. The molding rollers 33 and 34 are arranged at two bent portions in the sheet layered body 14. The molding rollers 35 and 36 are arranged at both end portions bent from the center portion of the width direction in the sheet layered body 14. The central axes of the molding rollers 33 to 36 are inclined from the width direction of the sheet layered body 14.

In the molding unit 17, the molding rollers 32 to 36 have the configurations same as those of the molding rollers 32 to 36 of each of the molding units 15 and 16. In the molding unit 17, the central axes of the molding rollers 35 and 36 are oriented in a direction perpendicular to the feeding direction and to the width direction of the sheet layered body 14.

In the molding unit 17, the molding rollers 41 to 45 are positioned on one side with respect to the sheet layered body 14. The molding roller 41 is arranged at the center portion of the sheet layered body 14 in the width direction, and has the central axis oriented in the width direction. The molding rollers 42 and 43 are ball rollers arranged at two bent portions in the sheet layered body 14 and freely rotatable around arbitrary axes passing through their own centers. The molding rollers 44 and 45 are arranged at both end portions bent from the center portion of the width direction in the sheet layered body 14, and sandwich the both end portions in corporation with the molding rollers 35 and 36.

<In Case of Target Shape as Hat Shape>

Figure 6A:
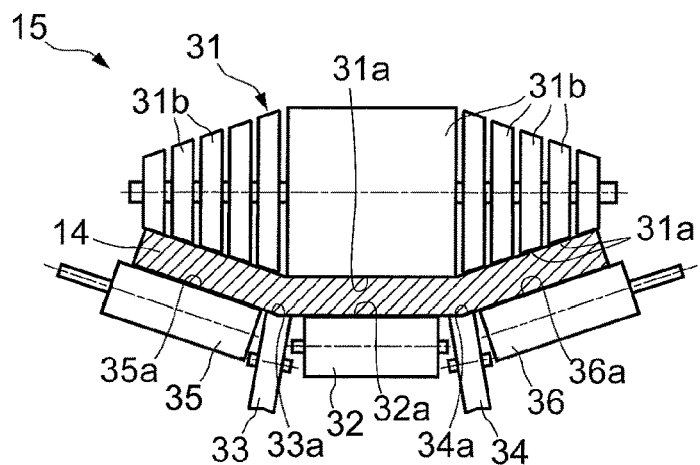
FIG. 6A to FIG. 6E illustrate configuration examples of molding units for a hat shape.
Figure 6B:
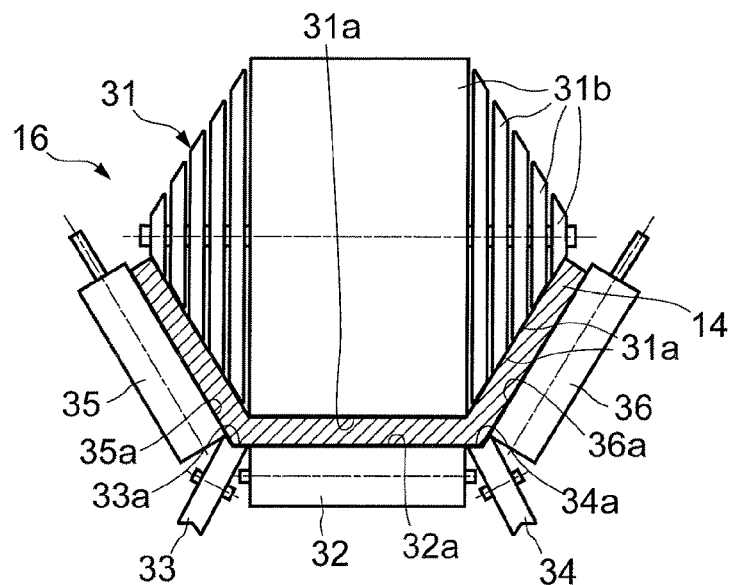
Figure 6C:
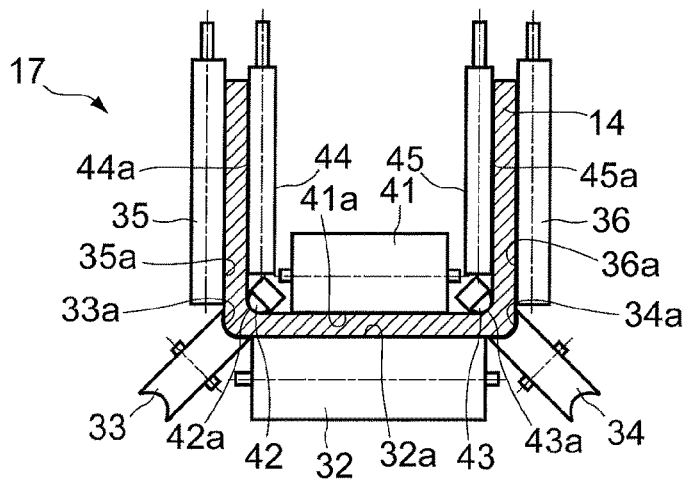
Figure 6D:
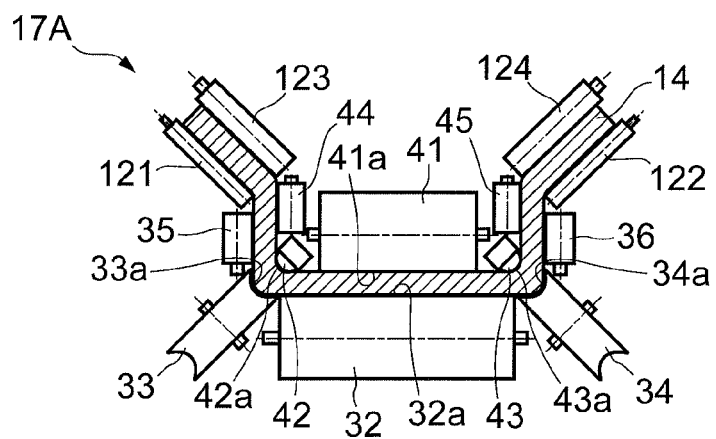
Figure 6E:
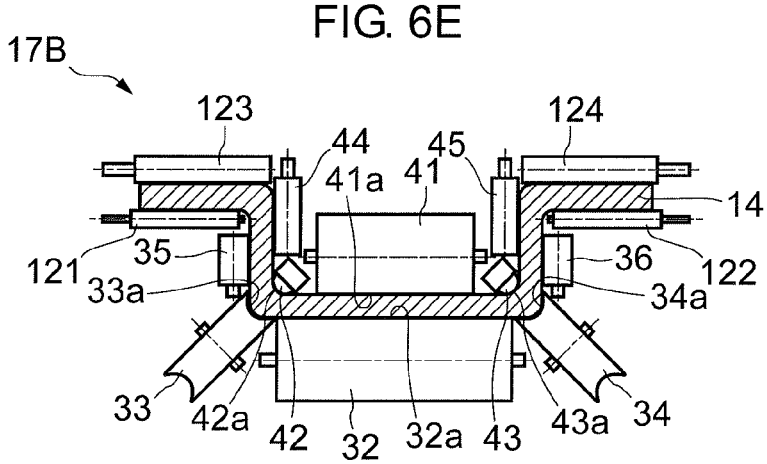

FIG. 6A to FIG. 6C are the A-A arrow view, the B-B arrow view, and the C-C arrow view in FIG. 1, respectively. When the target shape is a hat shape, not only the molding units 15, 16, and 17 but also the molding units 17A and 17B for example are provided as the molding units of the shaping mechanism 7. FIG. 6D and FIG. 6E illustrate configurations of the molding units 17A and 17B viewed in the feeding direction, respectively. The molding units 17A and 17B are provided between the molding unit 17 and the mold apparatus 37. The molding unit 17A is positioned on an upstream side of the molding unit 17B.

The sheet layered body 14 having the rectangular cross section passes through the molding units 15 to 17 in this order, and is thereby gradually bent and molded so as to have a cross-sectional shape (U-shape) closer to the target shape, similarly to the case of FIG. 5A to FIG. 5C. Configurations of the molding units 15, 16, and 17 are the same as those of the molding units 15, 16, and 17 described above with reference to FIG. 5A to FIG. 5C, and their description is thus omitted.

The sheet layered body 14 that has passed through the molding unit 17 passes through the molding units 17A and 17B in this order. Thereby, distal end portions in both end portions of the sheet layered body 14 are bent as illustrated in FIG. 6D and FIG. 6E. As a result, the sheet layered body 14 is molded so as to have a cross-sectional shape close to the target shape (hat shape). For this purpose, the molding units 17A and 17B each include a plurality of molding rollers 121 to 124 in addition to the configuration of the molding unit 17, as illustrated in FIG. 6D and FIG. 6E. The molding rollers 121 to 124 sandwich and mold the distal end portions in the both end portions.

Figure 7A:
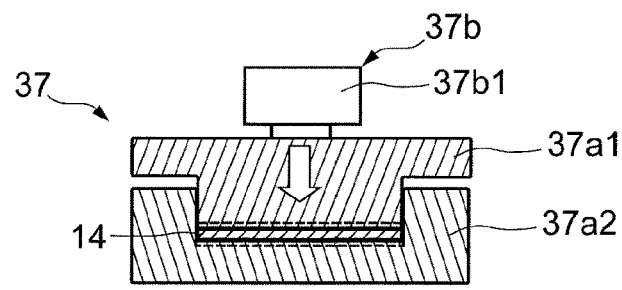
FIG. 7A to FIG. 7D illustrate configuration examples of a mold apparatus in FIG. 1.
Figure 7B:
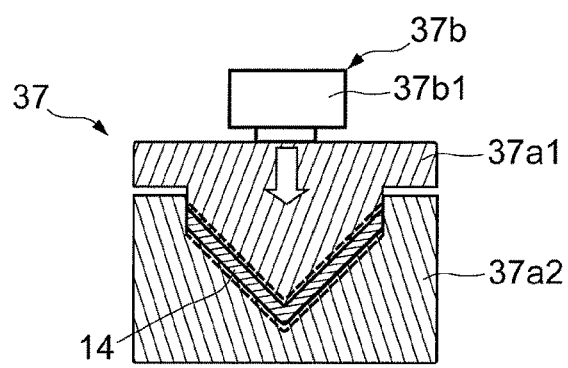
Figure 7C:
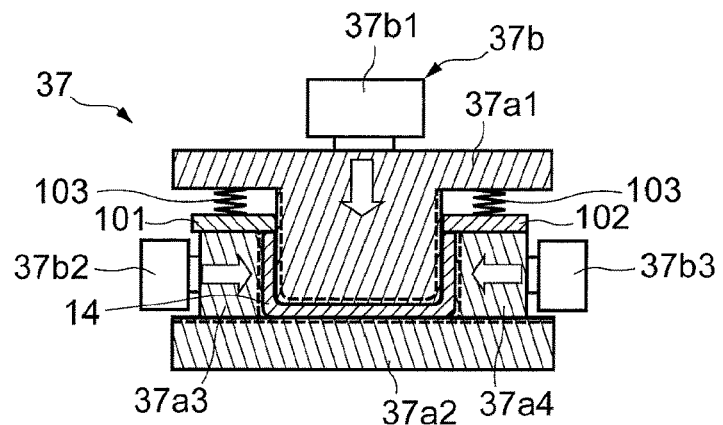
Figure 7D:
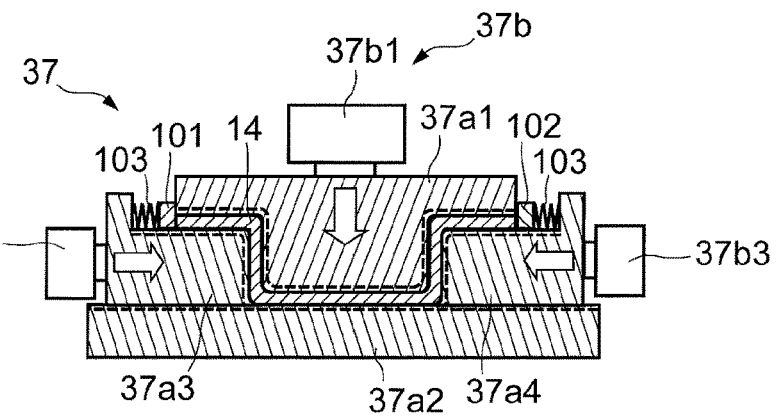

The mold apparatus 37 is arranged on a downstream side of a plurality of the molding units 15 to 17. The sheet layered body 14 from the molding units 15 to 17 is molded by the mold apparatus 37 so as to have a cross-sectional shape that is the target shape. FIG. 7A to FIG. 7D are each a cross-sectional view taken along the line VII-VII in FIG. 1. FIG. 7A illustrates the case where the target shape is rectangular. FIG. 7B illustrates the case where the target shape is L-shaped. FIG. 7C illustrates the case where the target shape is U-shaped. FIG. 7D illustrates the case where the target shape is hat-shaped.

The mold apparatus 37 includes a plurality of molds (molds 37a1 and 37a2 in FIG. 7A and FIG. 7B, molds 37a1 to 37a4 in FIG. 7C and FIG. 7D) each including an inner surface that forms the above-described passage region. These molds sandwich the sheet layered body 14 from the molding unit 17 in its thickness direction. The sheet layered body 14 is thereby molded so as to have the cross-sectional shape as the target shape. In other words, the sheet layered body 14 from the molding unit 17 passes through the passage region formed by the molding surfaces of a plurality of the molds. Thereby, in the sheet layered body 14, the reinforcement fibers are more impregnated with the resin, and the sheet layered body 14 is molded into the FRP 2 whose cross-sectional shape is the target shape.

The mold apparatus 37 includes a molding force generation device 37b. The molding force generation device 37b presses the mold of the mold apparatus 37 to generate molding force applied to the sheet layered body 14. In other words, the molding force generation device 37b presses the mold of the mold apparatus 37 in a direction of narrowing a width of the passage region formed by the molding surfaces of a plurality of the molds of the mold apparatus 37. Since the force with which the molding force generation device 37b presses the mold is preset (e.g., constant), a width of the passage region is automatically adjusted in response to fluctuation in thickness of the sheet layered body 14. In the examples of FIG. 7A to FIG. 7D, each white arrow represents a direction in which the molding force generation device 37b presses the mold.

In FIG. 7A to FIG. 7D, the molds (mold 37a1 and the like) each include the surface as the molding surface contacting with the sheet layered body 14, and the broken lines represent the molding surfaces that are at the most upstream positions in the respective molds in the feeding direction. An area of the passage region formed by the molding surfaces of a plurality of the molds of the mold apparatus 37 gradually decreases as a position shifts from an upstream end to a downstream end in the feeding direction. Thereby, the sheet layered body 14 can easily enter the passage region of the molds 37a, and comes to have the cross-sectional shape that is the target shape after passing through the passage region.

In each of FIG. 7A and FIG. 7B, the molding force generation device 37b includes a mold pressing device 37b1. The mold pressing device 37b1 presses the mold 37a1 toward the mold 37a2. In this case, the mold 37a2 may be fixed to an un-illustrated structure. In FIG. 7A and FIG. 7B, both end surfaces of the sheet layered body 14 in the left-right direction in each of these figures are restricted by inner surfaces of the mold 37a2.

In each of FIG. 7C and FIG. 7D, the molding force generation device 37b includes mold pressing devices 37b1 to 37b3. The mold pressing device 37b1 presses the mold 37a1 toward the mold 37a2, concerning a pair of the molds 37a1 and 37a2 arranged at upper and lower positions in FIG. 7C or FIG. 7D. In this case, the mold 37a2 may be fixed to an un-illustrated structure. In each of FIG. 7C and FIG. 7D, the molds 37a3 and 37a4 are arranged at the left and right in each of these figures. The molds 37a3 and 37a4 sandwich portions of the sheet layered body 14, in the left-right direction (hereinafter, simply referred to also as the left-right direction) in each of these figures, in corporation with the mold 37a1. The molds 37a3 and 37a4 are movable in the left-right direction along the mold 37a2. The mold pressing device 37b2 presses the mold 37a3 toward the mold 37a1 in the right direction in FIG. 7C or FIG. 7D. The mold pressing device 37*b*3 presses the mold 37*a*4 toward the mold 37*a*1 in the left direction in FIG. 7C or FIG. 7D.

In FIG. 7C or FIG. 7D, both end surfaces of the sheet layered body 14 that face upward or leftward and rightward in this figure are restricted by restriction members 101 and 102. The restriction member 101 is provided between the molds 37*a*1 and the molds 37*a*3, and is pressed toward the one end surface of the sheet layered body 14 by a spring 103 (or a cylinder device). The restriction member 102 is provided between the molds 37*a*1 and the molds 37*a*4, and is pressed toward the other end surface of the sheet layered body 14 by a spring 103 (or a cylinder device).

The mold pressing devices 37*b*1 to 37*b*3 are each a cylinder device that expands and contracts in the examples of FIG. 7A to FIG. 7D, but may be devices each generating the above-described molding force by a spring.

The cooling device 8 in FIG. 1 causes a cooling medium (cooling gas or cooling liquid) to flow through a cooling flow path (not illustrated) formed inside each of the molds of the mold apparatus 37, and thereby cools the molds. Accordingly, each of the molds of the mold apparatus 37 cools and cures the sheet layered body 14 while molding the sheet layered body 14. Each of the molds of the mold apparatus 37 may include an upstream portion and a downstream portion in the feeding direction. A heating device such as a heater or an induction heating coil may be provided inside the upstream portion. The above-described cooling flow path may be formed inside the downstream portion. The upstream portion and the downstream portion may be separated from each other or integrated with each other.

The pulling device 9 continuously pulls out the FRP 2 from the shaping mechanism 7 in the feeding direction. The pulling device 9 includes a plurality of clamping mechanisms 9*a* and 9*b*. Each of the clamping mechanisms 9*a* and 9*b* sandwich the FRP 2 in the thickness direction at an upstream position, moves to a downstream side in this state, then releases the FRP 2 at the downstream position, returns to the upstream position again, and sandwich the FRP 2 in its thickness direction again. A plurality of the clamping mechanisms 9*a* and 9*b* repeat this operation at mutually different timings so as to continuously pull out the FRP 2 to a downstream side. Thus, the FRP 2 that has been pulled out from the shaping mechanism 7 in the feeding direction is continuously transferred in the feeding direction to the cutting device 11 on the downstream side.

The cutting device 11 cuts out the FRP 2 having a desired length (a size in the feeding direction) from the FRP 2 continuously transferred from the shaping mechanism 7. The cut-out FRP 2 is used as an FRP product. The cutting device 11 may be a cutter, for example.

The non-destructive inspection device 38 performs an ultrasonic flaw detection on the FRP molded product to confirm that no molding defects (peeling or voids) exist.

An FRP continuous molding method according to the first embodiment uses the above-described FRP continuous molding apparatus 10, and thereby continuously molds an FRP 2 from a plurality of layered sheets 1*a*, 1*b*, and 1*c* each including thermoplastic resin and reinforcement fibers. This method includes the following steps S1 to S5.

At the step S1, a plurality of the sheet feeding devices 3*a*, 3*b*, and 3*c* continuously feed a plurality of layered sheets 1*a*, 1*b*, and 1*c*, respectively.

At the step S2, the layering device 5 layers, over each other, a plurality of the layered sheets 1*a*, 1*b*, and 1*c* continuously fed in the feeding direction at the step S1. Thereby, the layering device 5 forms the layered sheets 1*a*, 1*b*, and 1*c* into a sheet layered body 14.

At the step S3, the shaping mechanism 7 molds and cools the sheet layered body 14 while the sheet layered body 14 is being continuously transferred in the feeding direction (i.e., without stopping of transferring of the sheet layered body 14). This causes the sheet layered body 14 to be molded and cured into an FRP 2 whose cross-sectional shape is the target shape.

At the step S4, an FRP 2 having a desired length is cut out from the continuously transferred and coming FRP 2.

At the step S5, the non-destructive inspection device 38 performs ultrasonic flaw detection on the molded FRP 2 to thereby confirm that no molding defects exist in it.

The step S3 is performed in a state where the sheet layered body 14 is heated. For example, the sheet layered body 14 is heated by the heating device 6 before the step S3, or the sheet layered body 14 is molded by the heated molding rollers, thereby enabling the step S3 to be performed in a state where the sheet layered body 14 is heated.

According to the first embodiment, the sheet layered body 14 is softened by being heated as described above, because of characteristics of the thermoplastic resin. In this state, the sheet layered body 14 is molded by the shaping mechanism 7 so that molding can be facilitated. The sheet layered body 14 is molded in a state of being thus softened while continuously transferred in the feeding direction by the pulling device 9. Accordingly, at the time of being in the softened state, the sheet layered body is easily deformed by the tension in the feeding direction. In view of it, the reinforcement fibers are oriented in the feeding direction. The reinforcement fibers are thereby opposed against the tension in the feeding direction to prevent the sheet layered body from being deformed.

A plurality of FRP products (FRPs 2) may be further combined to be formed, by molds, into an FRP product having a new cross-sectional shape.

Second Embodiment

Figure 8:
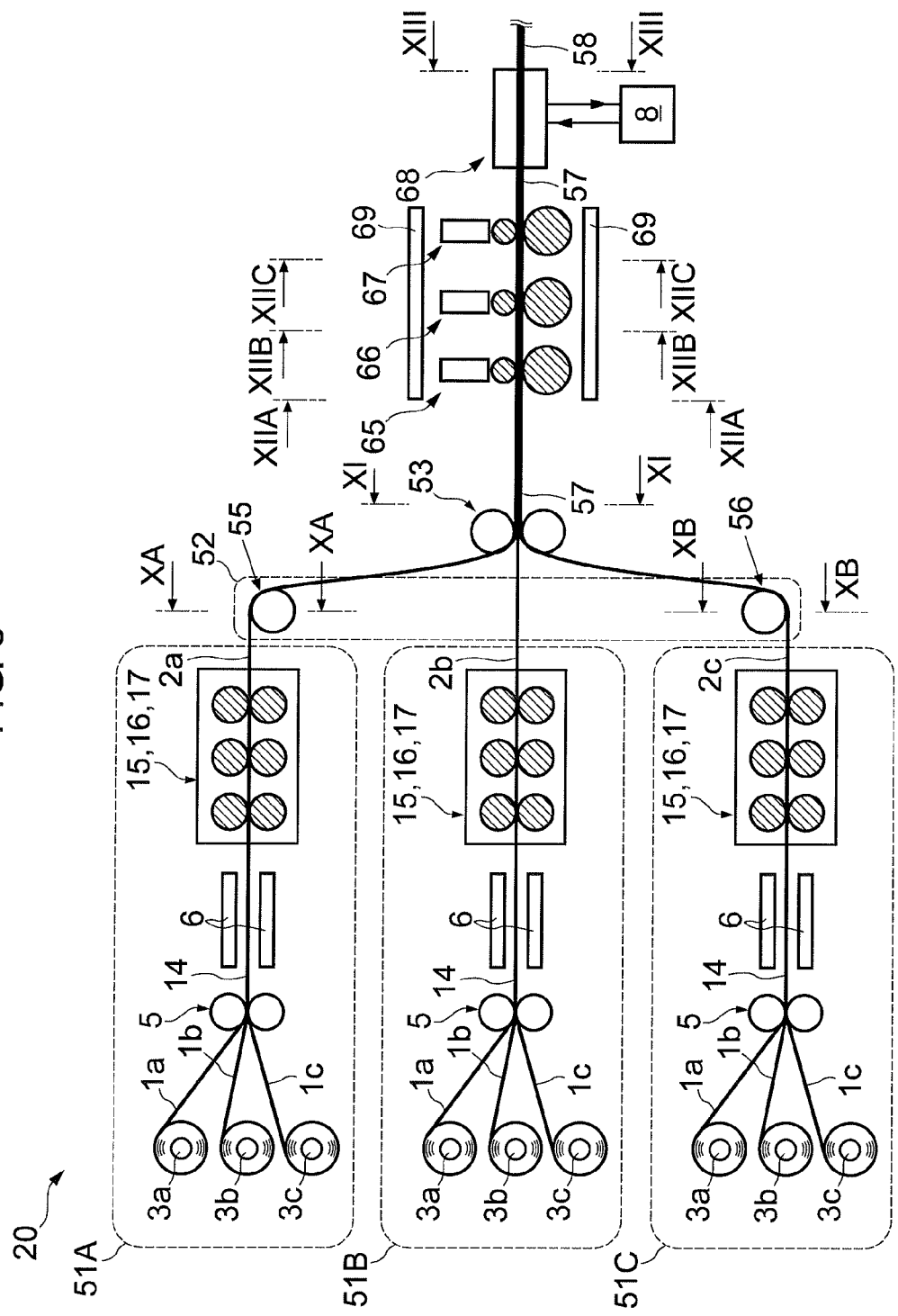
FIG. 8 is a schematic view illustrating an entire configuration of an FRP continuous molding apparatus according to a second embodiment of the present invention.
Figure 9:
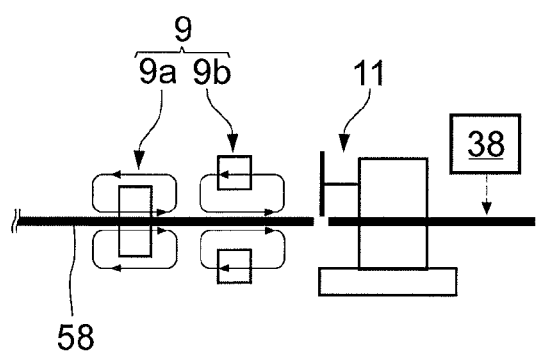
FIG. 9 illustrates configurations on a downstream side of FIG. 8.

FIG. 8 and FIG. 9 illustrate a configuration example of an FRP continuous molding apparatus 20 according to a second embodiment of the present invention. The FRP continuous molding apparatus 20 includes a plurality of molding line apparatuses 51A, 51B, and 51C, a guide mechanism 52, a combining apparatus 53, a plurality of molding units 65, 66, and 67, a mold apparatus 68, a cooling device 8, a pulling device 9, a cutting device 11, and a non-destructive inspection device 38.

Each of the molding line apparatuses 51A, 51B, and 51C includes the sheet feeding devices 3*a*, 3*b*, and 3*c*, the layering device 5, the heating device 6, and the molding units 15 to 17 that are described above and provided for molding an FRP 2 whose cross section is the target shape. The molding units 15 to 17 constitute the shaping mechanism 7. Each of the molding line apparatuses 51A, 51B, and 51C continuously molds, from a plurality of the layered sheets 1*a*, 1*b*, and 1*c*, an FRP 2 whose cross section is the target shape (e.g., the rectangular shape, the L-shape, or the U-shape). The respective FRPs 2 molded by a plurality of the molding line apparatuses 51A, 51B, and 51C are referred to as an FRP 2*a*, an FRP 2*b*, and an FRP 2*c*, as illustrated in FIG. 8.

The guide mechanism 52 guides a plurality of the FRPs 2 transferred from a plurality of the molding line apparatuses 51A, 51B, and 51C, so as to be transferred to the combining apparatus 53.

A plurality of the FRPs 2*a*, 2*b*, and 2*c* are transferred to the combining apparatus 53 from the molding units 15 to 17 of a plurality of the molding line apparatuses 51A, 51B, and 51C. The combining apparatus 53 combines the transferred FRPs 2a, 2b, and 2c so as to have a new cross-sectional shape (close to a final target shape) as a whole. A combined body 57 as the thus-combined three FRPs 2a, 2b, and 2c is sent out from the combining apparatus 53.

The molding units 65, 66, and 67 are arranged at a plurality of respective positions in the feeding direction. The molding units 65, 66, and 67 each include a plurality of molding rollers that sandwich the combined body 57. A plurality of the molding rollers may compress the combined body 57. The molding rollers each include the molding surface forming the passage region. Each of the molding rollers constituting each of the molding unit 65, 66, and 67 is rotationally driven or simply freely rotatable around its own central axis. The below-described ball rollers are simply freely rotatable.

The number of the molding units 65, 66, and 67 is three in the example of FIG. 8, but may be one, two, or four or more. A plurality of the molding rollers may include a molding roller including the molding surface and including a heater or an induction heating coil that is arranged inside this molding roller and that heats the molding surface. The heated molding surface molds the combined body 57 while softening the combined body 57. An incorporated heating mechanism such as the heater may be absent in the molding roller, and a heating device 69 (heating furnace or the like) outside the molding rollers may heat the combined body 57. The heater or the induction heating coil inside the molding roller in the molding units 65, 66, and 67, or the heating device 69 outside the molding roller constitutes a heating device that heats the combined body 57 while a molding mechanism is molding the combined body 57.

The mold apparatus 68 is arranged on the downstream side of the molding units 65, 66, and 67, and molds, into the final target shape, a cross section of the combined body 57 from the molding units 65, 66, and 67. The mold apparatus 68 includes a plurality of molds that each include an inner surface forming the passage region for the combined body 57, similarly to the mold apparatus 37 of the first embodiment. These molds sandwich the combined body 57 from the molding units 65, 66, and 67, in its thickness direction, and thereby mold the cross section of the combined body 57 into the final target shape. In other words, an area of the passage region formed by the molding surfaces of a plurality of the molds gradually decrease as a position shifts from an upstream end to a downstream end in the feeding direction, similarly to the mold apparatus 37 of the first embodiment. The combined body 57 passes through the passage region. Thereby, in the combined body 57, the reinforcement fibers are more impregnated with the resin, and the combined body 57 is molded into an FRP 58 whose cross-sectional shape is the target shape.

The mold apparatus 68 includes a molding force generation device (e.g., the below-described molding force generation device 68b in FIG. 13). The molding force generation device presses the mold of the mold apparatus 68 to generate molding force applied to the combined body 57. In other words, the molding force generation device presses the mold of the mold apparatus 68 in a direction of narrowing a width of the passage region formed by the molding surfaces of a plurality of the molds of the mold apparatus 68. Since the force with which the molding force generation device presses the mold is preset (e.g., constant), a width of the passage region is automatically adjusted in response to fluctuation in thickness of the combined body 57.

The molding units 65, 66, and 67 and the mold apparatus 68 constitute the molding mechanism that molds the combined body 57 into an FRP 58 whose cross-sectional shape is the final target shape. This molding mechanism includes the molding surfaces that form the passage region when viewed in the feeding direction. The combined body 57 passes through the passage region. A shape of the passage region viewed in the feeding direction approaches the final target shape as a position shifts to a more downstream side.

The cooling device 8 in FIG. 8 causes a cooling medium (cooling gas or cooling liquid) to flow through a cooling flow path (not illustrated) formed inside each of the molds of the mold apparatus 68, and thereby cools the molds. Accordingly, each of the molds of the mold apparatus 68 cools and cures the combined body 57 while molding the combined body 57. Each of the molds of the mold apparatus 68 may include an upstream portion and a downstream portion in the feeding direction. A heating device such as a heater or an induction heating coil may be provided inside the upstream portion. The above-described cooling flow path may be formed inside the downstream portion. The upstream portion and the downstream portion may be separated from each other or integrated with each other.

The pulling device 9 continuously pulls out the FRP 58 from the mold apparatus 68 in the feeding direction. The pulling device 9 includes a plurality of clamping mechanisms 9a and 9b. A plurality of the clamping mechanisms 9a and 9b repeat, at mutually different timings, operation of sandwiching the FRP 58 in its thickness direction at upstream positions, moving to downstream sides in this state, then releasing the FRP 58 at downstream positions, returning to the upstream positions again, and sandwiching the FRP 58 in its thickness direction again, similarly to the case of the first embodiment. Thus, the FRP 58 that has been pulled out from the mold apparatus 68 in the feeding direction is continuously transferred in the feeding direction to the cutting device 11 on the downstream side.

The cutting device 11 cuts out the FRP 58 having a desired length (a size in the feeding direction) from the FRP 58 continuously transferred from the mold apparatus 68.

The non-destructive inspection device 38 performs an ultrasonic flaw detection on the cut-out FRP 58 to confirm that no molding defects (peeling or voids) exist.

An FRP continuous molding method according to the second embodiment uses the above-described FRP continuous molding apparatus 20, and thereby continuously molds a fiber-reinforced plastic from a plurality of layered sheets 1a, 1b, and 1c. This method includes the following steps S11 to S15.

At the step S11, a plurality of the molding line apparatuses (the molding line apparatuses 51A, 51B, and 51C in the example of FIG. 8) mold a plurality of FRPs 2 (FRPs 2a, 2b, and 2c in the example of FIG. 8), respectively.

At the step S12, the combining apparatus 53 combines a plurality of the FRPs 2 molded at the step S11. Thereby, the combining apparatus 5 forms the FRPs 2 into a combined body 57 having a new cross-sectional shape.

At the step S13, the molding units 65, 66, and 67 and the mold apparatus 68 mold and cool the combined body 57 while the combined body 57 is being continuously transferred in the feeding direction (i.e., without stopping of transferring of the combined body 57). This causes the combined body 57 to be molded and cured into an FRP 58 whose cross-sectional shape is the final target shape.

At the step S14, an FRP 58 having a desired length is cut out from the continuously transferred and coming FRP 58.

At the step S15, the non-destructive inspection device 38 performs ultrasonic flaw detection on the molded FRP 58 to thereby confirm that no molding defects exist in it.

<In Case of Final Target Shape as Inverted T-Shape>

The first to third molding line apparatuses 51A, 51B, and 51C are provided as illustrated in FIG. 8 when the FRP continuous molding apparatus 20 molds the FRP 58 having a cross-sectional shape that is an inverted T-shape as the final target shape.

The first and second molding line apparatuses 51A and 51B each include the sheet feeding device 3a, 3b, and 3c, the layering device 5, the heating device 6, and the molding units 15 to 17 that are described above and that are provided for molding an FRP 2a or 2b having an L-shaped cross section, with the molding units 15 to 17 constituting the shaping mechanism 7. In other words, each of the first and second molding line apparatuses 51A and 51B continuously molds a plurality of the layered sheets 1a, 1b, and 1c into the FRP 2a or 2b having the L-shaped cross section, and continuously transfers the FRP 2a or 2b in the feeding direction.

The third molding line apparatus 51C include the sheet feeding device 3a, 3b, and 3c, the layering device 5, the heating device 6, and the molding units 15 to 17 that are described above and that are provided for molding an FRP 2c having a rectangular cross section, with the molding units 15 to 17 constituting the shaping mechanism 7. In other words, the third molding line apparatus 51C continuously molds a plurality of the layered sheets 1a, 1b, and 1c into the FRP 2c having the rectangular cross section while continuously transferring the FRP 2c in the feeding direction.

Figure 10A:
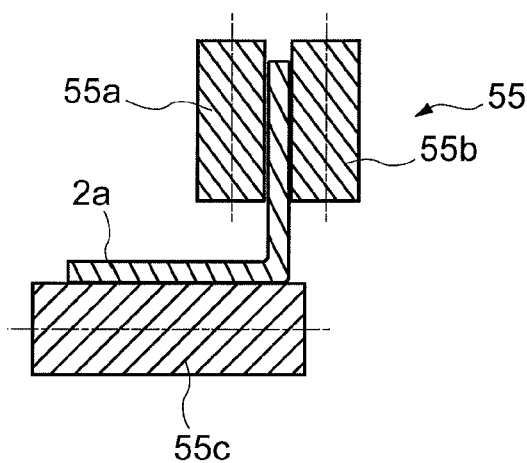
FIG. 10A and FIG. 10B illustrate configuration examples of guide devices for an inverted T-shape in the second embodiment.

FIG. 10A is the XA-XA arrow view in FIG. 8, and illustrates a configuration example of a guide device 55 as a part of a guide mechanism 52. The guide device 55 includes a pair of rollers 55a and 55b and a roller 55c. The rollers 55a and 55b sandwich one portion belonging to FRP 2a and extending from the bent portion in the L-shaped cross section of FRP 2a. The roller 55c contacts with another portion (a surface facing to a side of the below-described combining apparatus 53) belonging to FRP 2a and extending from the bent portion in the L-shaped cross section of FRP 2a. The rollers 55a to 55c are each arranged so as to be freely rotatable around its own central axis.

Figure 10B:
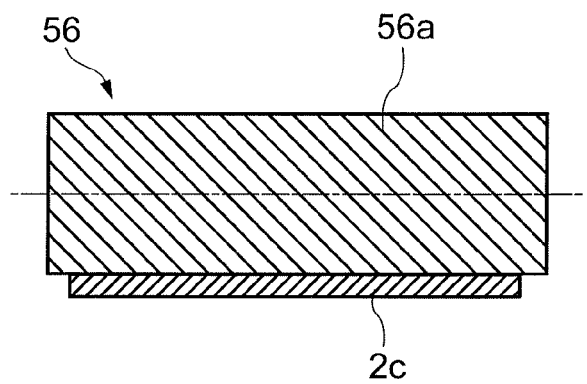

FIG. 10B is the XB-XB arrow view in FIG. 8, and illustrates a configuration example of a guide device 56 as a part of the guide mechanism 52. The guide device 56 includes a roller 56a contacting with the FRP 2c (a surface facing to a side of the below-described combining apparatus 53). The roller 56a is arranged so as to be freely rotatable around its own central axis.

Figure 11:
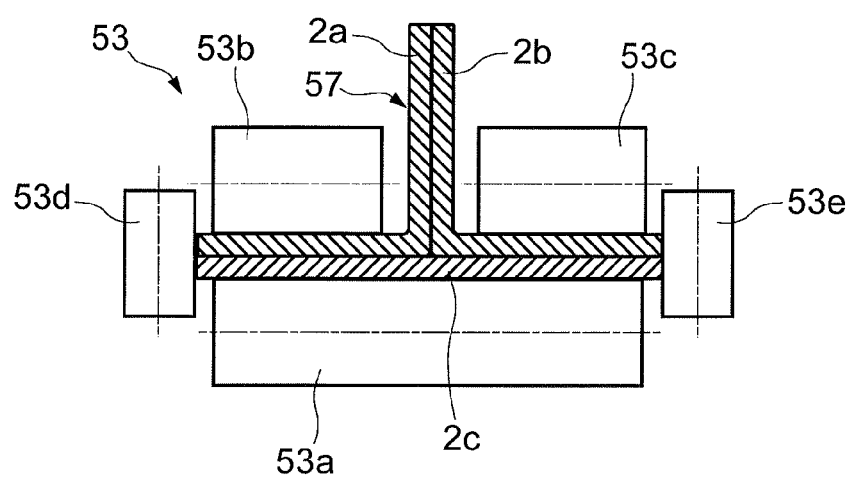
FIG. 11 illustrates a configuration example of a combining apparatus for an inverted T-shape in the second embodiment.

FIG. 11 is the XI-XI arrow view in FIG. 8, and illustrates a configuration example of the combining apparatus 53. The combining apparatus 53 in FIG. 11 includes rollers 53a to 53e. The rollers 53a to 53e are rotatable around their own central axes. The rollers 53a to 53e contact with the FRPs 2a to 2c and guide the FRPs 2a to 2c such that the FRPs 2a to 2c forms an inverted T-shape as a whole. The first to third molding line apparatuses 51A to 51C may be each set in a posture inclined from the posture in FIG. 8 around the axis of the left-right direction of FIG. 8, such that the FRPs 2a to 2c having the postures illustrated in FIG. 11 are transferred to the combining apparatus 53.

Figure 12A:
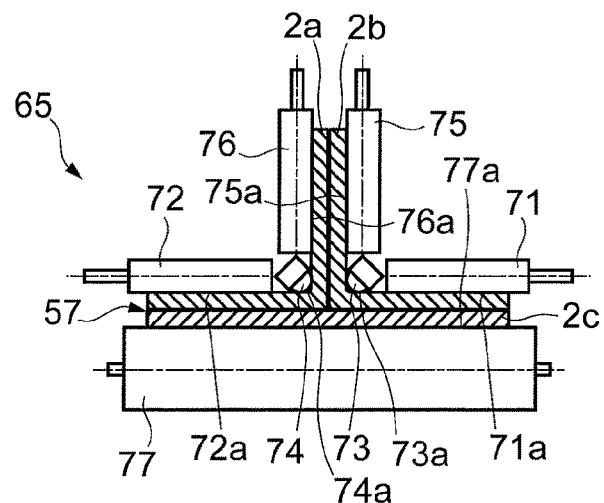
FIG. 12A to FIG. 12C illustrate configuration examples of molding units for the inverted T-shape in the second embodiment.
Figure 12B:
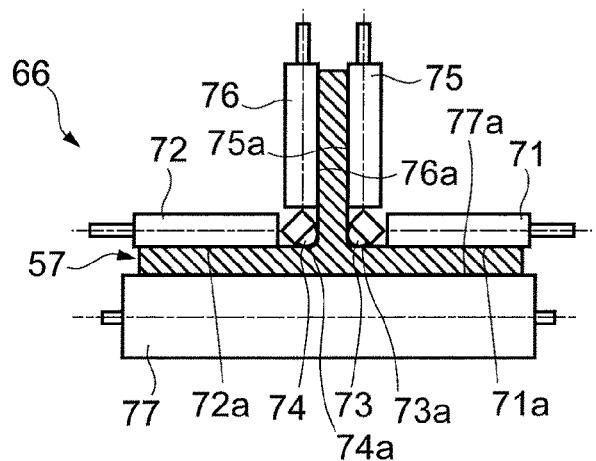
Figure 12C:
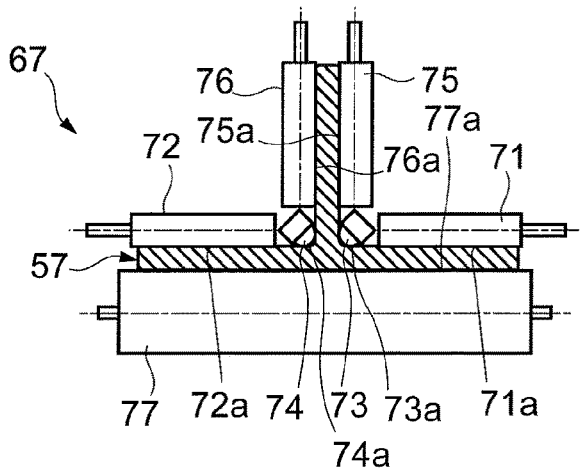

FIG. 12A to FIG. 12C illustrate configuration examples of a plurality of the molding units 65, 66, and 67. FIG. 12A, FIG. 12B, and FIG. 12C are the XIIA-XIIA arrow view, the XIIB-XIIB arrow view, and the XIIC-XIIC arrow view in FIG. 8, respectively.

The molding units 65, 66, and 67 in the configuration examples of FIG. 12A to FIG. 12C each include molding rollers 71 to 77. In each of the molding units 65, 66, and 67, a portion of the combined body 57 is compressed by and between the molding rollers 73 and 75 and the molding rollers 74 and 76 in its thickness direction (the horizontal direction in FIG. 12A to FIG. 12C), and another portion of the combined body 57 is compressed by and between the molding rollers 71 to 74 and the molding roller 77 in its thickness direction (the vertical direction in FIG. 12A to FIG. 12C). Thereby, the FRPs 2a to 2c constituting the combined body 57 are adhered to each other. The molding rollers 71, 72, and 75 to 77 are cylindrical, and the molding rollers 73 and 74 are ball rollers arranged at corners of the central portion of the combined body 57 in each of FIG. 12A to FIG. 12C and freely rotatable around arbitrary axes passing through their own centers.

The molding rollers 71 to 77 each include molding surfaces 71a to 77a forming the above-described passage region. A width of each portion of this passage region becomes narrower as a position shifts to the molding unit on a more downstream side in the feeding direction. In other words, a shape of this passage region approaches the final target shape as a position shifts to the molding unit on a more downstream side in the feeding direction.

Figure 13:
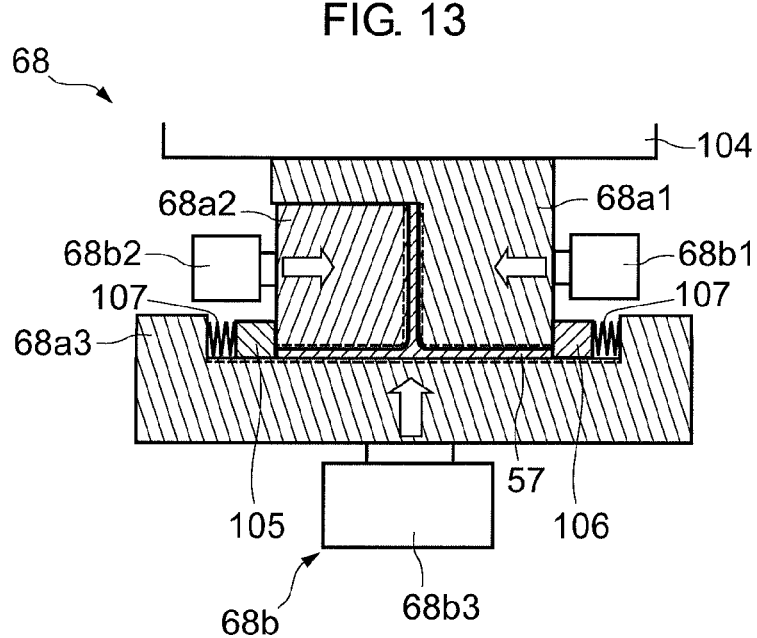
FIG. 13 illustrates a configuration example of a mold apparatus for the inverted T-shape in the second embodiment.

FIG. 13 is a cross-sectional view taken along the line XIII-XIII of FIG. 8, and illustrates the mold apparatus 68 when the final target shape is the inverted T-shape. The mold apparatus 68 includes a plurality of molds 68a1 to 68a3 and the molding force generation device 68b. Each of the mold 68a1 to 68a3 in FIG. 13 includes a surface as a molding surface that contacts with the combined body 57. The broken lines in FIG. 13 represent the molding surfaces of the mold 68a1 to 68a3 at the most upstream position in the feeding direction.

A pair of molds 68a1 and 68a2 in FIG. 13 are arranged so as to sandwich a portion of the combined body 57 in the left-right direction in this figure. The mold 68a1 is provided so as to be movable along a guide 104 in the left-right direction (hereinafter, simply referred to also as the left-right direction) in FIG. 13. A position of the guide 104 may be fixed. The mold 68a2 is provided so as to be movable in the left-right direction along a part of the mold 68a1.

The molding force generation device 68b includes mold pressing devices 68b1 to 68b3. A plurality of the white arrows in the example of FIG. 13 represent directions in which the mold pressing devices 68b1 to 68b3 press the molds. The mold pressing device 68b1 presses the mold 68a1 toward the mold 68a2 in the left direction in FIG. 13. The mold pressing device 68b2 presses the mold 68a2 toward the mold 68a1 in the right direction in FIG. 13. The mold pressing device 68b3 presses the mold 68a3 toward the molds 68a1 and 68a2 in the upward direction in FIG. 13.

The combined body 57 in FIG. 13 includes an end surface that faces in the upward direction in this figure and that is restricted by the inner surface of the mold 68a1. The combined body 57 in FIG. 13 includes both left and right end surfaces restricted by restriction members 105 and 106. The restriction member 105 is provided between the molds 68a2 and the molds 68a3, and is pressed toward the left end surface of the combined body 57 by a spring 107 (or a cylinder device). The restriction member 106 is provided between the molds 68a1 and the molds 68a3, and is pressed toward the right end surface of the combined body 57 by a spring 107 (or a cylinder device).

The mold pressing devices 68b1 to 68b3 in the example of FIG. 13 are cylinder devices that expand and contract, but may be devices that generate the above-described molding force by springs.

In the case of molding the FRP 58 having the inverted T-shaped cross section, the above-described FRP 2c may be omitted. In other words, the combined body 57 in a state where the FRP 2c is omitted from the combined body 57 in FIG. 12A may be molded by the molding units 65, 66, and 67 and the mold apparatus 68. In this case, the third molding line apparatus 51C may be omitted, and configurations and arrangement shapes of the combining apparatus 53, the molding units 65, 66, and 67, the mold apparatus 68, and the like may be appropriately modified in accordance with the omission of the FRP 2c.

Figure 14:
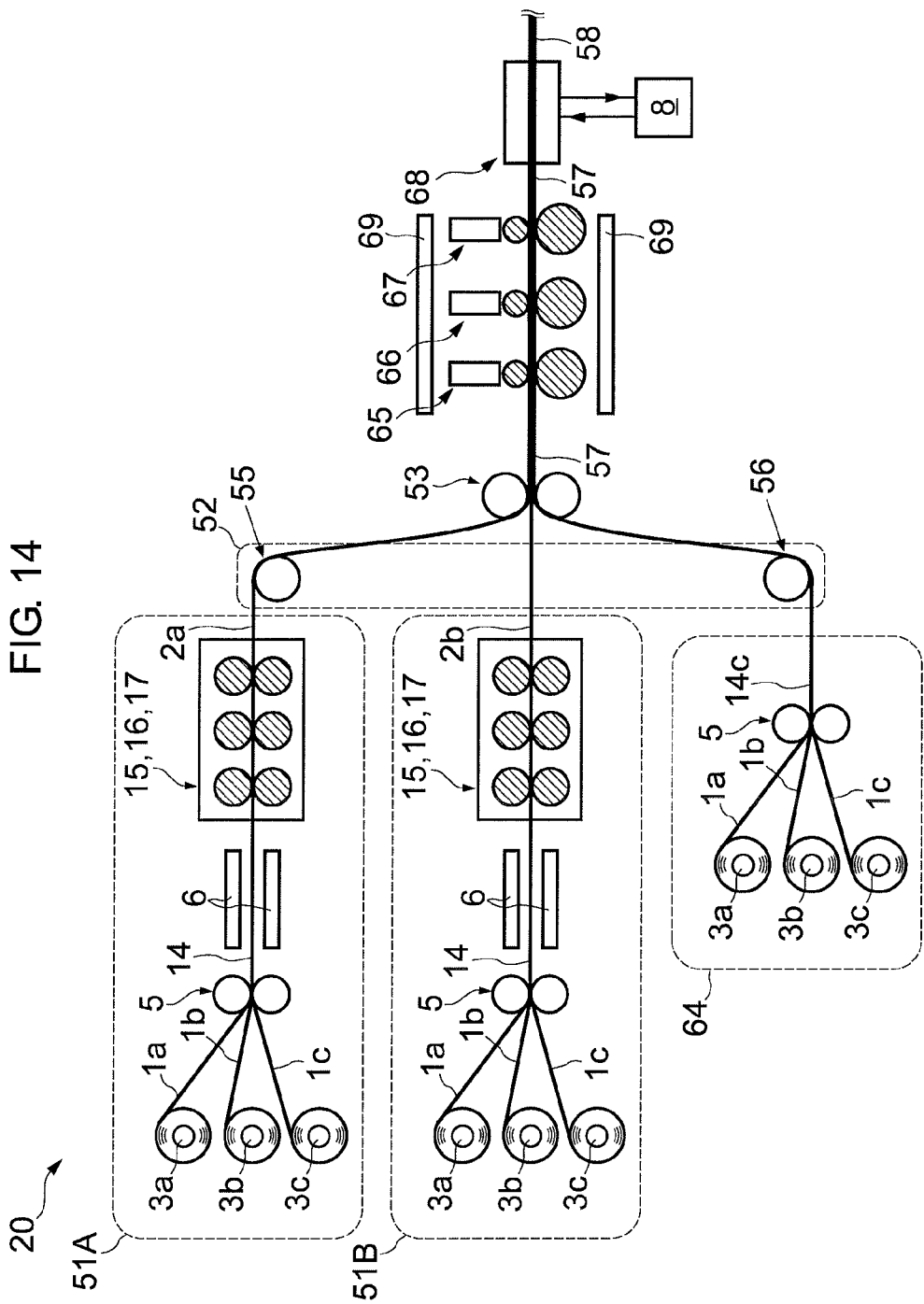
FIG. 14 illustrates another configuration example of an FRP continuous molding apparatus for the inverted T-shape in the second embodiment.

FIG. 14 illustrates another configuration example of the FRP continuous molding apparatus 20 in the case of molding the FRP 58 having the inverted T-shaped cross section. The configuration example in FIG. 14 may include a layered body feeding apparatus 64 instead of the third molding line apparatus 51C. The layered body feeding apparatus 64 includes a plurality of the sheet feeding devices 3a, 3b, and 3c and the layering device 5. In this case, the layering device 5 in the layered body feeding apparatus 64 layers, into a sheet layered body 14c, a plurality of the layered sheets 1a, 1b, and 1c from a plurality of the sheet feeding devices 3a, 3b, and 3c. The sheet layered body 14c has a rectangular cross section, and is used instead of the FRP 2c. The above description applies to this case such that the words "FRP 2c" are replaced with the words "sheet layered body 14c". The configuration example of FIG. 14 includes, on the downstream side of the mold apparatus 68, the configurations that are the same as those described above and that are configured as illustrated in FIG. 9.

<In Case of Final Target Shape as H-Shape>

Figure 15:
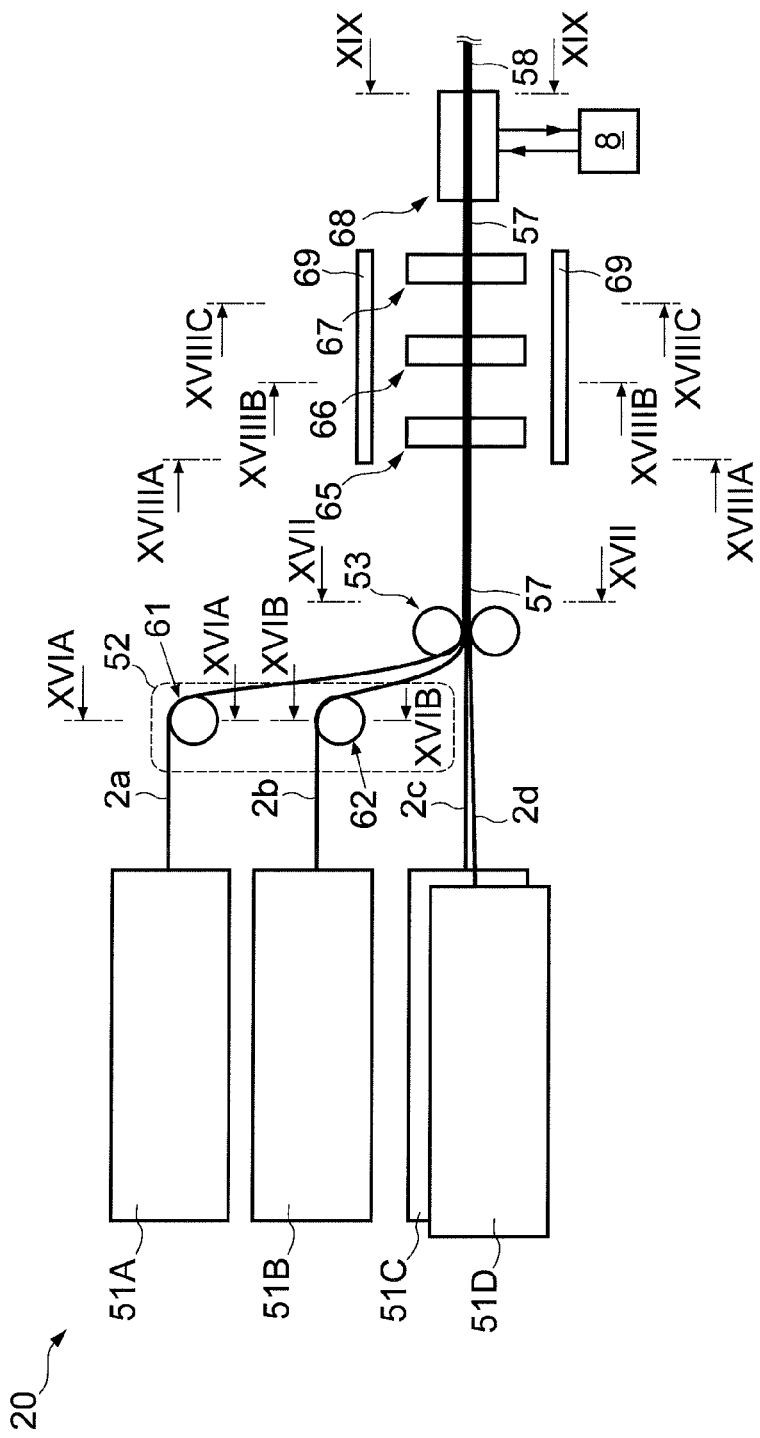
FIG. 15 illustrates a configuration example of an FRP continuous molding apparatus for an H-shape in the second embodiment.

FIG. 15 illustrates an entire configuration example of the FRP continuous molding apparatus 20 for molding the FRP 58 whose cross section is H-shaped.

The FRP continuous molding apparatus 20 includes first to fourth molding line apparatus 51A to 51D as illustrated in FIG. 15. The first and second molding line apparatuses 51A and 51B each include the sheet feeding devices 3a, 3b, and 3c, the layering device 5, the heating device 6, and the molding units 15 to 17 that are described above and that are provided for molding the FRP 2 having a U-shaped cross section, with the molding units 15 to 17 constituting the shaping mechanism 7. The third and fourth molding line apparatuses 51C and 51D each include the sheet feeding devices 3a, 3b, and 3c, the layering device 5, the heating device 6, and the molding units 15 to 17 that are described above and that are provided for molding the FRP 2 having a rectangular cross section, with the molding units 15 to 17 constituting the shaping mechanism 7. Hereinafter, the FRPs 2 molded by the first to fourth molding line apparatuses 51A to 51D are referred to as the FRP 2a, the FRP 2b, the FRP 2c, and the FRP 2d in this order, as illustrated in FIG. 15. In FIG. 15, the configuration example of FIG. 15 includes, on the downstream side of the mold apparatus 68, the configurations that are the same as those described above and that are configured as illustrated in FIG. 9.

The guide mechanism 52 guides the four FRPs 2 transferred from the first to fourth molding line apparatuses 51A to 51D, so as to be transferred to the combining apparatus 53.

Figure 16A:
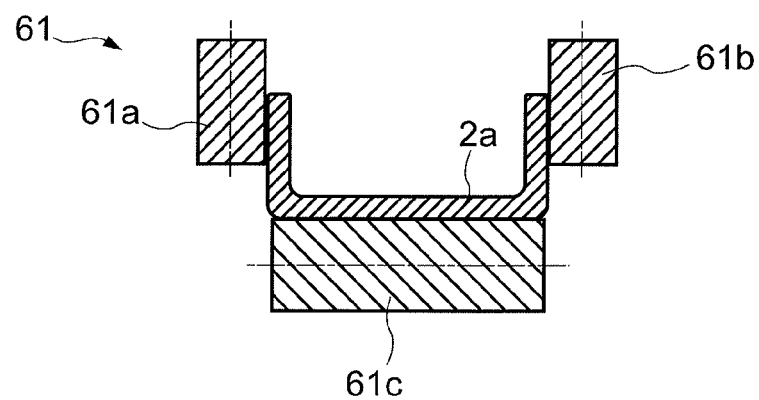
FIG. 16A and FIG. 16B illustrate configuration examples of guide devices for the H-shape in the second embodiment.

FIG. 16A is the XVIA-XVIA arrow view in FIG. 15, and illustrates a configuration example of a guide device 61 as a part of the guide mechanism 52. The guide device 61 includes a pair of rollers 61a and 61b and a roller 61c. The rollers 61a and 61b contact with both end portions of the U-shaped cross section of the FRP 2a, and sandwich the FRP 2a in a first direction (the let-right direction in FIG. 16A). The roller 61c contacts with a central portion (a surface facing to a side of the below-described combining apparatus 53) of the U-shaped cross section of the FRP 2a. Each of the rollers 61a to 61c are arranged so as to be freely rotatably around its own central axes.

Figure 16B:
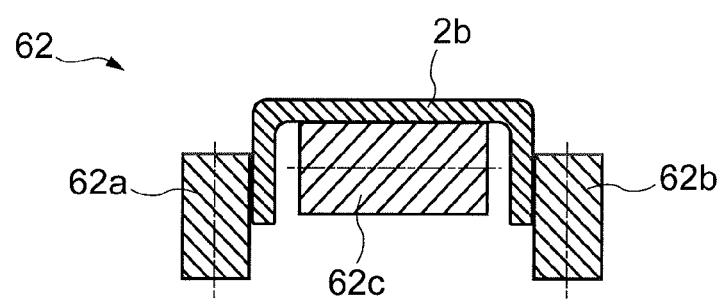

FIG. 16B is the XVIB-XVIB arrow view in FIG. 15, and illustrates a configuration example of a guide device 62 as a part of the guide mechanism 52. The guide device 62 includes a pair of rollers 62a and 62b and a roller 62c, similarly to the guide device 61. The rollers 62a and 62b sandwich the FRP 2b in a first direction (the let-right direction in FIG. 16B). The roller 62c contacts with a central portion (a surface facing to a side of the below-described combining apparatus 53) of the U-shaped cross section of the FRP 2a. Each of the rollers 62a to 62c are arranged so as to be freely rotatably around its own central axes.

The four FRPs 2a to 2d are transferred to the combining apparatus 53 from the first to fourth molding line apparatuses 51A to 51D. The combining apparatus 53 combines the transferred FRPs 2a to 2d so as to have a new entire cross-sectional shape that is an H-shape. A combined body 57 formed by thus combining the four FRPs 2a to 2d is sent out from the combining apparatus 53.

Figure 17:
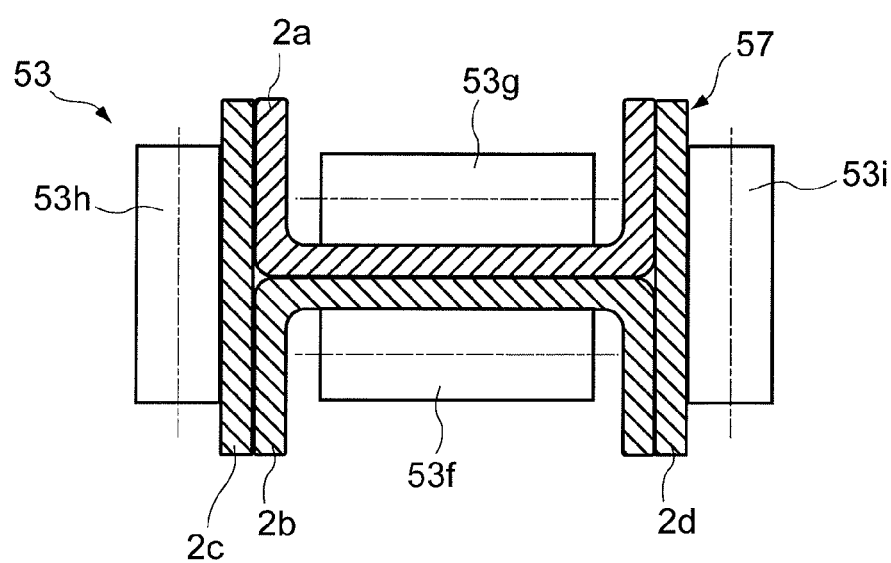
FIG. 17 illustrate a configuration example of a combining apparatus for the H-shape in the second embodiment.

FIG. 17 is the XVII-XVII arrow view of FIG. 15, and illustrates a configuration example of the combining apparatus 53. The combining apparatus 53 includes rollers 53f to 53i, as illustrated in FIG. 17. The rollers 55f to 55i are freely rotatable around their own central axes. The rollers 55f to 55i guide the FRPs 2a to 2d while contacting with the FRPs 2a to 2d such that the FRPs 2a to 2d come to have the entire H-shaped cross section. Orientations of the first to fourth molding line apparatuses 51A to 51D may be set such that the FRPs 2a to 2d having the postures illustrated in FIG. 17 are transferred to the combining apparatus 53.

Figure 18A:
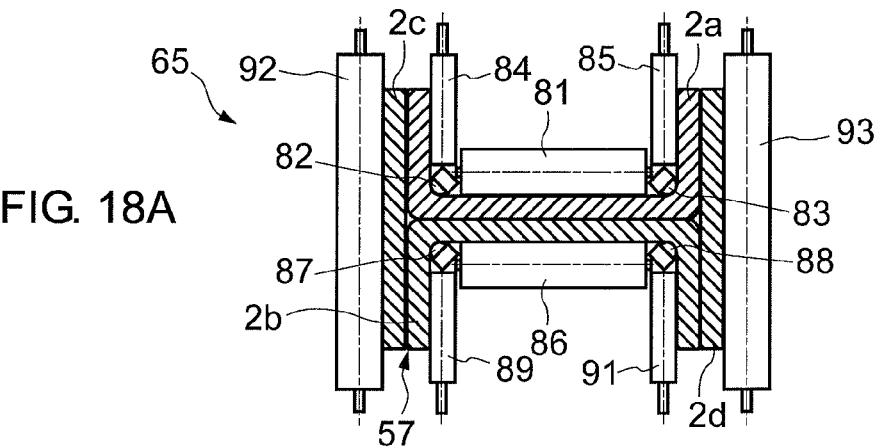
FIG. 18A to FIG. 18C illustrate configuration examples of molding units for the H-shape in the second embodiment.
Figure 18B:
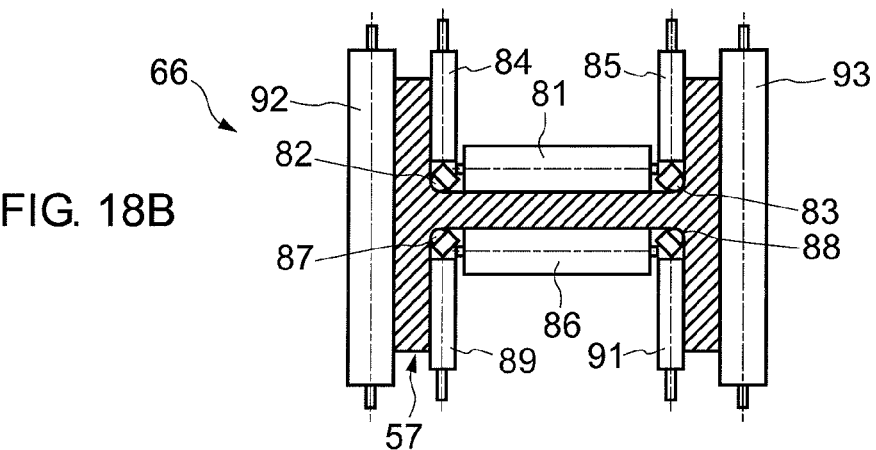
Figure 18C:
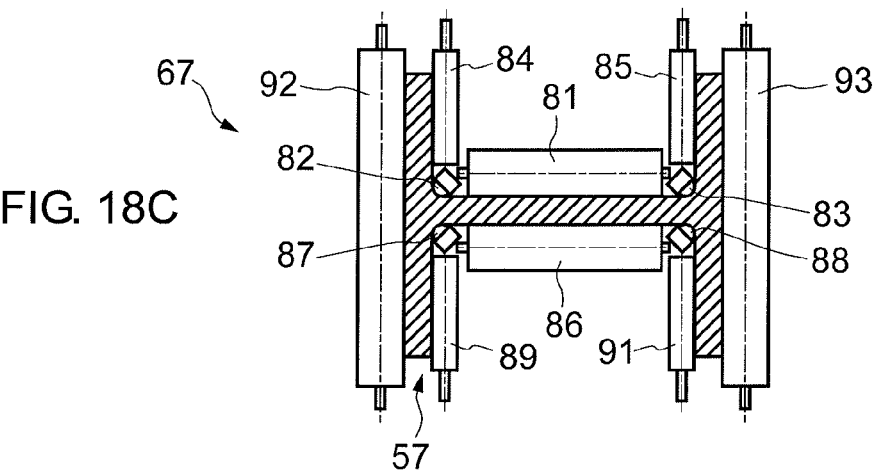

FIG. 18A to 18C illustrate configuration examples of a plurality of the molding units 65, 66, and 67. FIG. 18A, FIG. 18B, and FIG. 18C are the XVIIIA-XVIIIA arrow view, the XVIIIB-XVIIIB arrow view, and the XVIIIC-XVIIIC arrow view in FIG. 15, respectively.

The molding units 65, 66, and 67 in the configuration examples of FIG. 18A to FIG. 18C each include molding rollers 81 to 89 and 91 to 93. In each of the molding units 65, 66, and 67, a left portion of the combined body 57 is compressed in its thickness direction (the left-right direction in FIG. 18A to FIG. 18C) by and between the molding rollers 82, 84, 87, and 89 and the molding roller 92, a right portion of the combined body 57 is compressed in its thickness direction (the left-right direction in FIG. 18A to FIG. 18C) by and between the molding rollers 83, 85, 88, and 91 and the molding roller 93, and a central portion of the combined body 57 is compressed in its thickness direction (the vertical direction in FIG. 18A to FIG. 18C) by and between the molding rollers 81 to 83 and the molding rollers 86 to 88. Thereby, the FRPs 2a to 2d constituting the combined body 57 are adhered to each other. The molding rollers 81, 84 to 86, 89, and 91 to 93 are cylindrical, and the molding rollers 82, 83, 87, and 88 are ball rollers arranged at four inner corners of the combined body 57 in FIG. 18A to FIG. 18C and freely rotatable around arbitrary axes passing through their own centers.

The molding rollers 81 to 89 and 91 to 93 include surfaces as molding surfaces that contact with the combined body 57 and that form the passage region for the combined body 57.

A width of each portion of this passage region becomes narrower as a position shifts to the molding unit on s more downstream side in the feeding direction. In other words, a shape of this passage region approaches the final target shape as a position shifts to the molding unit on a more downstream side in the feeding direction.

Figure 19:
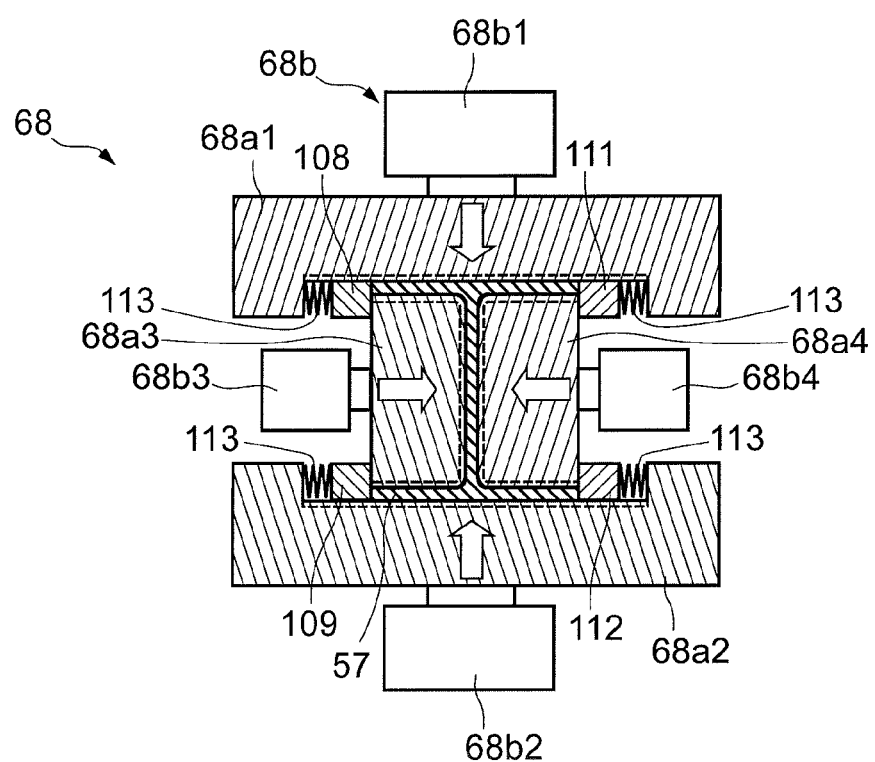
FIG. 19 illustrates a configuration example of a mold apparatus for the H-shape in the second embodiment.

FIG. 19 is the cross-sectional view taken along the line XIX-XIX in FIG. 15, and illustrates the mold apparatus 68 in the case where the final target shape is the H-shape. The mold apparatus 68 includes a plurality of molds 68a1 to 68a4. The molds 68a1 to 68a4 in FIG. 19 each include a surface as the molding surface that contacts with the combined body 57. The broken lines in FIG. 19 represent the molding surfaces at the most upstream positions in the respective molds 68a1 to 68a4 in the feeding direction.

A pair of the molds 68a1 and 68a2 in FIG. 19 are arranged at upper and lower sides in this figure. A pair of the molds 68a3 and 68a4 are arranged on left and right sides of FIG. 19.

The molding force generation device 68b includes mold pressing devices 68b1 to 68b4. A plurality of white arrows in the example of FIG. 19 represent directions in which the mold pressing devices 68b1 to 68b4 press the molds. The mold pressing devices 68b1 and 68b2 press a pair of the molds 68a1 and 68a2 toward each other, respectively. The mold pressing devices 68b3 and 68b4 press a pair of the molds 68a3 and 68a4 toward each other, respectively.

The combined body 57 in FIG. 19 includes end surfaces in the left-right direction in this figure that are restricted by restriction members 108, 109, 111, and 112. The restriction member 108 is provided between the mold 68a1 and the mold 68a3, and is pressed toward the upper left end surface of the combined body 57 by a spring 113 (or a cylinder device). The restriction member 109 is provided between the mold 68a2 and the mold 68a3, and is pressed toward the lower left end surface of the combined body 57 by a spring 113 (or a cylinder device). The restriction member 111 is provided between the mold 68a1 and the mold 68a4, and is pressed toward the upper right end surface of the combined body 57 by a spring 113 (or a cylinder device). The restriction member 112 is provided between the mold 68a2 and the mold 68a4, and is pressed toward the lower right end surface of the combined body 57 by a spring 113 (or a cylinder device).

The mold pressing devices 68b1 to 68b4 are cylinder devices that expand and contract in the example of FIG. 19, but may be devices that generate the above-described molding force by springs.

The above-described FRP 2c and 2d may be omitted in the case of molding the FRP 58 having the H-shaped cross section. In other words, the combined body 57 in a state where the FRPs 2c and 2d are omitted from the combined body 57 in FIG. 17 may be molded into the FRP 58 having the H-shaped cross section by the molding units 65, 66, and 67 and the mold apparatus 68. In this case, the third and fourth molding line apparatuses 51C and 51D may be omitted, and configurations and arrangement shapes of the combining apparatus 53, the molding units 65, 66, and 67, the mold apparatus 68, and the like may be appropriately modified in accordance with the omission of the FRPs 2c and 2d.

Figure 20:
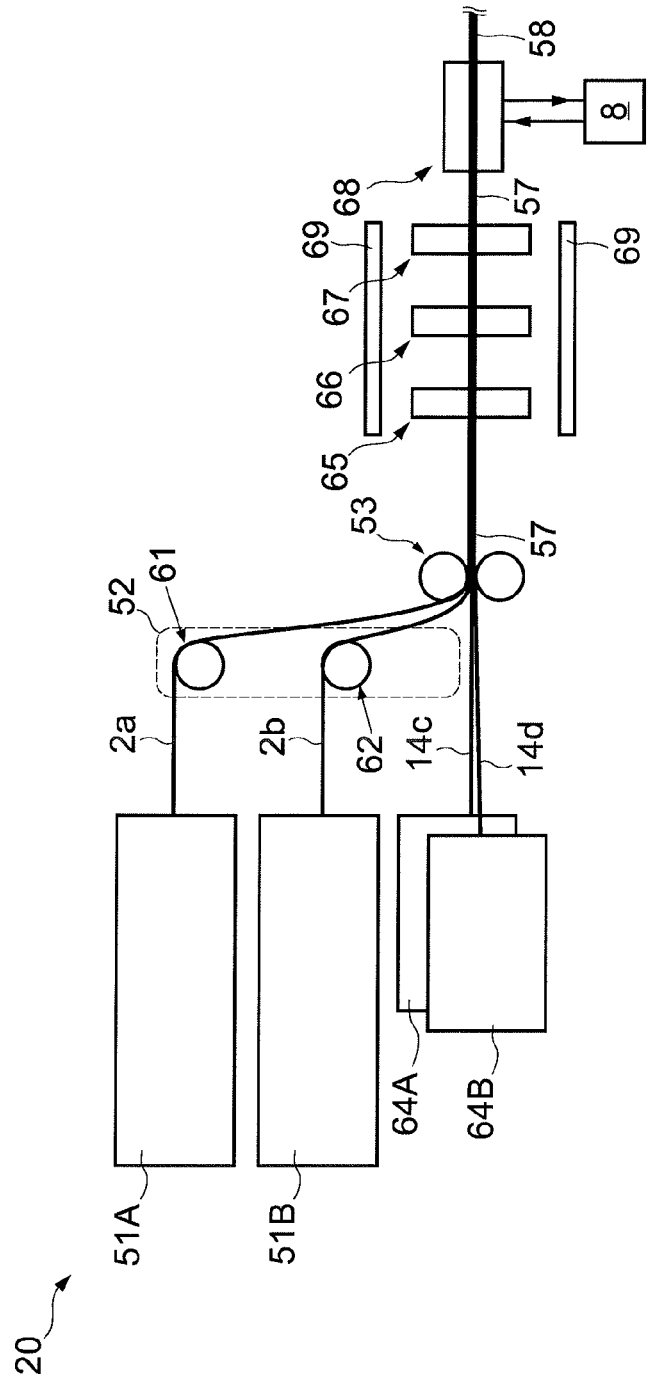
FIG. 20 illustrates another configuration example of an FRP continuous molding apparatus for the H-shape in the second embodiment.

FIG. 20 illustrates another configuration example of the FRP continuous molding apparatus 20 in the case of molding the FRP 58 having the H-shaped cross section. The configuration example in FIG. 20 includes a layered body feeding apparatus 64A instead of the third molding line apparatus 51C. The layered body feeding apparatus 64A includes a plurality of the sheet feeding devices 3a, 3b, and 3c and the layering device 5. In this case, the layering device 5 in the layered body feeding apparatus 64A layers, into a sheet layered body 14c, a plurality of the layered sheets 1a, 1b, and 1c from a plurality of the sheet feeding devices 3a, 3b, and 3c. The sheet layered body 14c has a rectangular cross section, and is used instead of the FRP 2c. Further, a layered body feeding apparatus 64B may be provided instead of the fourth molding line apparatus 51D. The layered body feeding apparatus 64B includes a plurality of the sheet feeding devices 3a, 3b, and 3c and the layering device 5. In this case, the layering device 5 in the layered body feeding apparatus 64B layers, into a sheet layered body 14d, a plurality of the layered sheets 1a, 1b, and 1c from a plurality of the sheet feeding devices 3a, 3b, and 3c. The sheet layered body 14d has a rectangular cross section, and is used instead of the FRP 2d. The above description applies to this case such that the words "FRPs 2c and 2d" are replaced with the words "sheet layered bodies 14c and 14d", respectively. The configuration example of FIG. 20 includes, on the downstream side of the mold apparatus 68, the configurations that are the same as those described above and that are configured as illustrated in FIG. 9.

According to the second embodiment, the combined body 57 is softened by being heated as described above, because of characteristics of the thermoplastic resin. In this state, the combined body 57 is molded by the molding mechanism (molding units 65, 66, and 67 and the mold apparatus 68) so that molding can be facilitated. Meanwhile, at the time of being in the softened state, the combined body 57 is easily deformed by tension in the feeding direction. In view of it, the reinforcement fibers are oriented in the feeding direction. The reinforcement fibers are thereby opposed against the tension in the feeding direction to prevent the combined body 57 from being deformed.

The present invention is not limited to the above-described embodiments. Various modifications can be naturally made within the scope of the technical idea of the present invention. For example, any one of the following modified examples 1 to 3 may be adopted, or two or more of the modified examples 1 to 3 may be arbitrarily combined and adopted. In this case, the matters that are not described below may be the same as those described above.

(Modified Example 1)

In the above description, the force for continuously pulling the layered sheets 1a, 1b, and 1c, the sheet layered body 14, the FRP 2, and the FRP 58 in the feeding direction is generated by the pulling device 9 and the rotational driving of the molding rollers. However, the present invention is not limited to this. For example, this force for pulling may be generated by the pulling device 9 instead of by the molding rollers and the pulling device 9.

(Modified Example 2)

The molding surfaces of the mold apparatus 37 extend linearly from the upstream side to the downstream end in the above-described embodiment. However, in the modified example 2, the molding surfaces may extend from the upstream side to the downstream end while curving (e.g., in a warped shape).

Figure 21A:
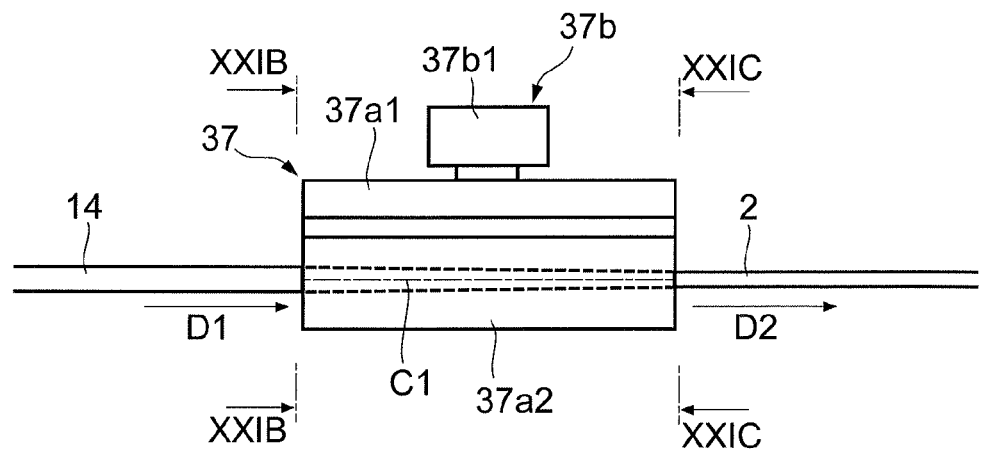
FIG. 21A to FIG. 21C illustrate a configuration example of the mold apparatus.
Figure 21B:
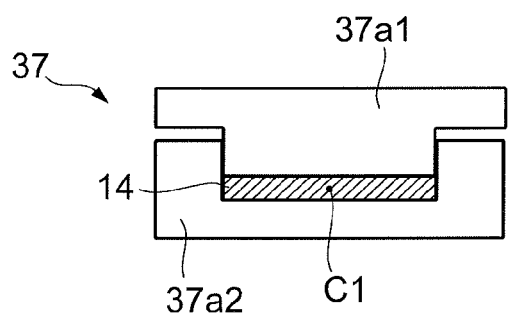
Figure 21C:
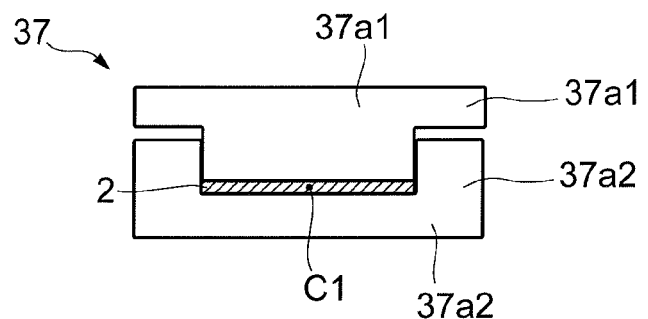

First, the case of the above-described embodiment is described with reference to FIG. 21A to FIG. 21C. FIG. 21A is a side view of the above-described mold apparatus 37 viewed in a direction perpendicular to the feeding direction. FIG. 21A illustrates the case where the target shape is rectangular. FIG. 21B and FIG. 21C are the XXIB-XXIB arrow view and the XXIC-XXIC arrow view in FIG. 21A, respectively. FIG. 21B and FIG. 21C omit illustrations of the molding force generation device 37b. The following describes the case where the target shape is rectangular, with reference to FIG. 21A to FIG. 21C. However, the following applies also to the case where the target shape is another shape.

The mold apparatus 37 in the above-described embodiment includes the molding surfaces (the molding surfaces represented by the broken lines in FIG. 21A) in its inside that may extend linearly from the upstream end to the downstream end in the mold apparatus 37. In other words, in the mold apparatus 37, the passage region through which the sheet layered body 14 passes has center line C1 (the one-dot chain line in FIG. 21A) extending linearly from the upstream end to the downstream end in the passage region. Accordingly, the direction D1 in which the sheet layered body 14 enters an inside of the mold apparatus 37 at the upstream end of the mold apparatus 37 is the same as the direction D2 in which the molded sheet layered body 14 (i.e., FRP 2) exits to an outside of the mold apparatus 37 at the downstream end of the mold apparatus 37.

Figure 22A:
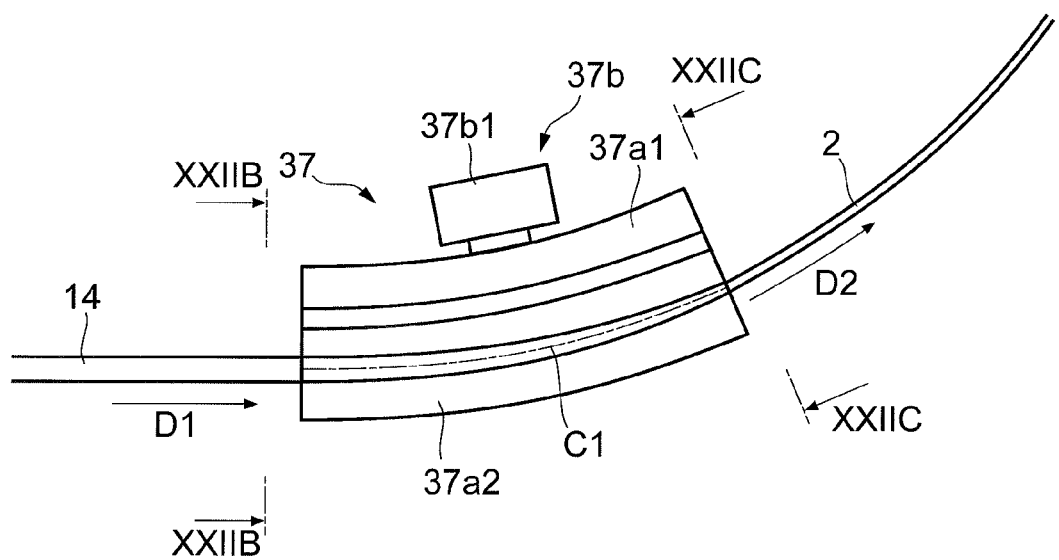
FIG. 22A to FIG. 22C illustrate a modified example of the mold apparatus.
Figure 22B:
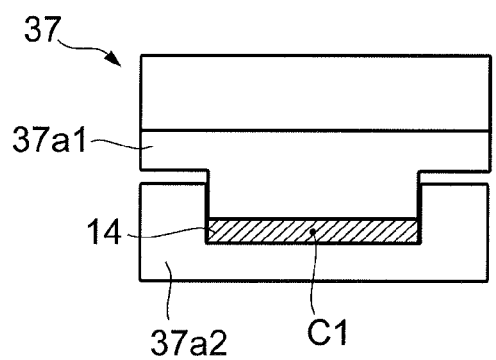
Figure 22C:
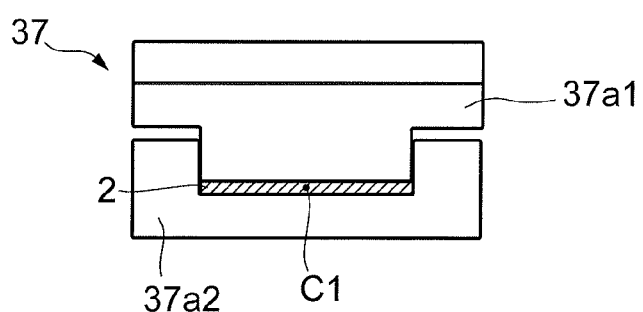

Next, the case of the modified example 2 is described with reference to FIG. 22A to FIG. 22C. FIG. 22A is a side view of the above-described mold apparatus 37 viewed in a direction perpendicular to the feeding direction. FIG. 22A illustrates the case where the target shape is rectangular. FIG. 22B and FIG. 22C are the XXIIB-XXIIB arrow view and the XXIIC-XXIIC arrow view in FIG. 22A, respectively. FIG. 22B and FIG. 22C omit illustrations of the molding force generation device 37b. The following describes the case where the target shape is rectangular, with reference to FIG. 22A to FIG. 22C. However, the following applies also to the case where the target shape is another shape.

The mold apparatus 37 in the modified example 2 includes the molding surfaces (the molding surfaces represented by the broken lines in FIG. 22A) in its inside that extend from an upstream side (e.g., the upstream end) to the downstream end in the mold apparatus 37 while curving (e.g., in a warped shape). In other words, in the mold apparatus 37, the passage region through which the sheet layered body 14 passes has the center line C1 (the one-dot chain line in FIG. 22A) extending from an upstream side (e.g., the upstream end) to the downstream end in the passage region while curving (e.g., in a warped shape). Accordingly, the direction D1 in which the sheet layered body 14 enters an inside of the mold apparatus 37 at the upstream end of the mold apparatus 37 is different from the direction D2 in which the molded sheet layered body 14 (i.e., FRP 2) exits to an outside of the mold apparatus 37 at the downstream end of the mold apparatus 37. The FRP 2 molded by such a mold apparatus 37 has a curved shape. The pulling device 9 pulls out the FRP 2 from the mold apparatus 37 in the direction D.

(Modified Example 3)

Figure 23A:
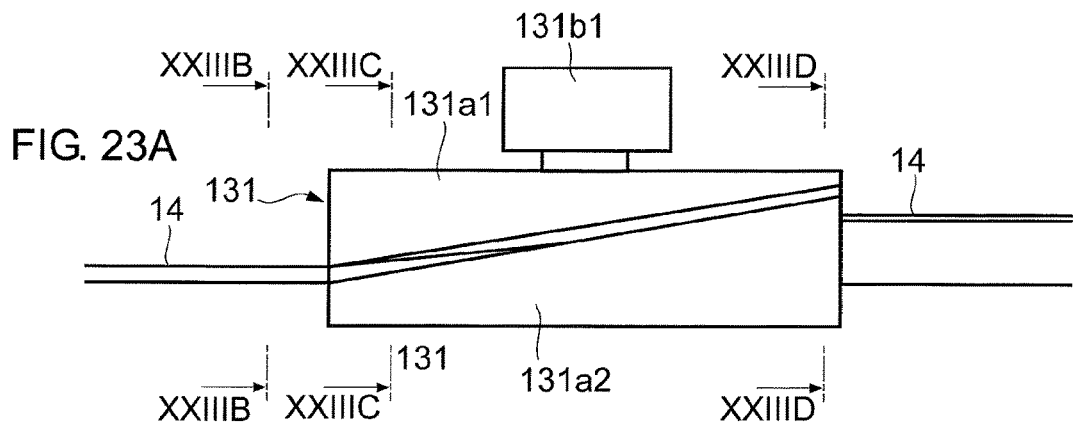
FIG. 23A to FIG. 23D illustrate a modified example of the mold apparatus.

A mold apparatus may be provided as a molding unit, instead of the above-described molding units 15 to 17 or 15 to 17B. This mold apparatus is an upstream mold apparatus with respect to the downstream mold apparatus 37. FIG. 23A is a side view of the mold apparatus 131 provided instead of the molding units 15 to 17.

Figure 23B:
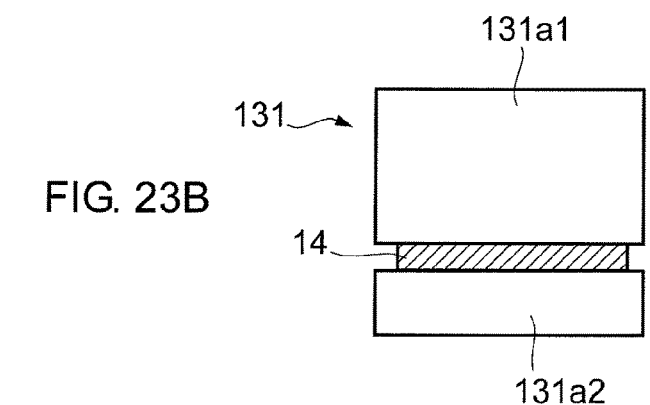
Figure 23C:
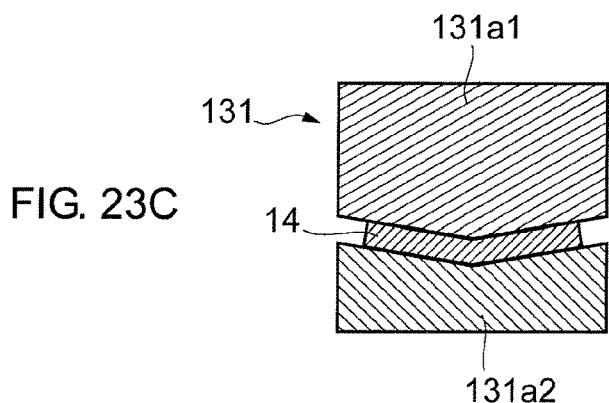
Figure 23D:
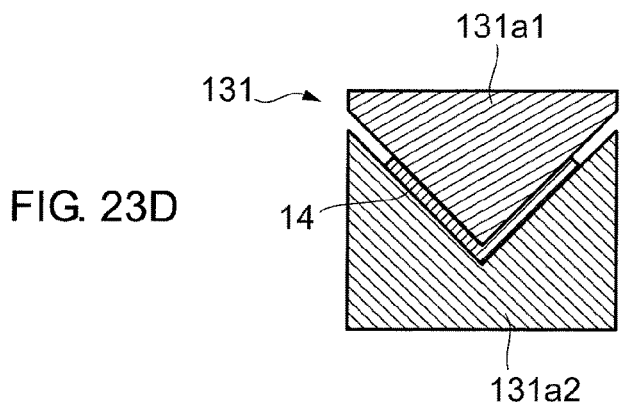

FIG. 23A illustrates the case where the target shape is an L-shape. FIG. 23B to FIG. 23D are the XXIIIB-XXIIIB arrow view, the sectional view taken along the line XXIIIC-XXIIIC, and the sectional view taken along the line XXIIID-XXIIID in FIG. 23A, respectively. FIG. 23B to FIG. 23D omit illustrations of the below-described molding force generation device 131b.

The mold apparatus 131 includes a pair of molds 131a1 and 131a2 with molding surfaces forming the above-described passage region, and the molding force generation device 131b.

The molds 131a1 and 131a2 sandwich the sheet layered body 14 in its thickness direction so as to cause a cross section of the sheet layered body 14 to approach the target shape. A shape of the passage region sandwiched between the molds 131a1 and 131a2 approaches the target shape (L-shape) as a position shifts from the upstream end (the left side in FIG. 23A) to the downstream end (the right side in FIG. 23A) in the mold apparatus 131, as illustrated in FIG. 23B to FIG. 23C.

The molding force generation device 131b presses the mold 131a1 toward the mold 131a2 to generate molding force applied to the sheet layered body 14.

The molding surfaces of the molds 131a1 and 131a2 may be heated by a heater or an induction heating coil arranged inside the molds 131a1 and 131a2. The heated molding surfaces of the molds 131a1 and 131a2 mold the sheet layered body 14 while softening the sheet layered body 14. No heating mechanisms such as a heater may be incorporated in the molds 131a1 and 131a2, and the sheet layered body 14 may be heated by a heating device (heating furnace or the like) outside the molds 131a1 and 131a2. The heater or the induction heating coil inside the molds 131a1 and 131a2, or the heating device 25 outside the molds 131a1 and 131a2 constitutes a heating device that heats the sheet layered body 14 while the shaping mechanism 7 is molding the sheet layered body 14.

Figure 24A:
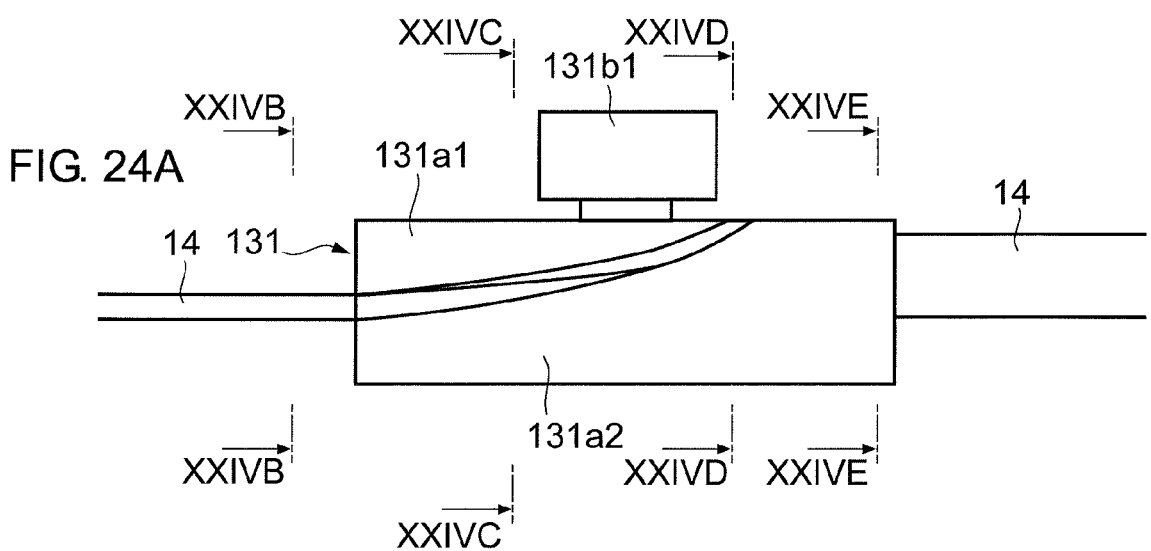
FIG. 24A to FIG. 24H illustrate a modified example of the mold apparatus.
Figure 24B:
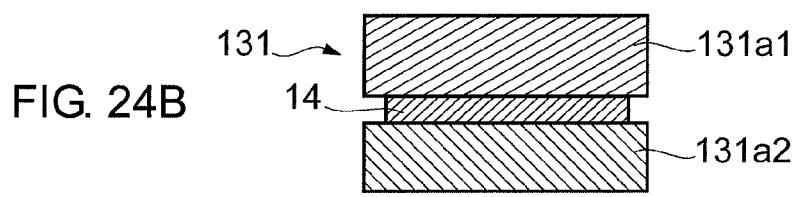
Figure 24C:
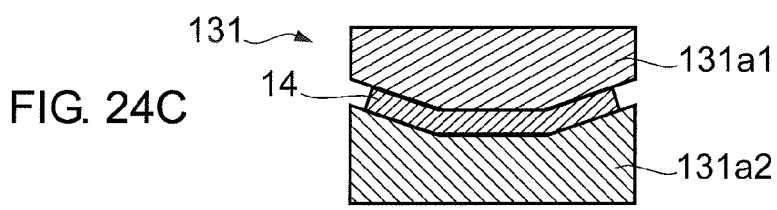
Figure 24D:
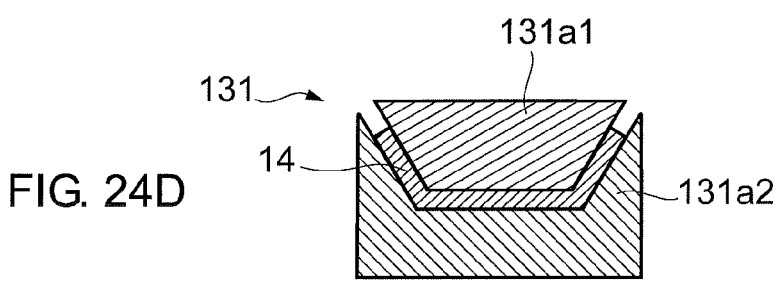
Figure 24E:
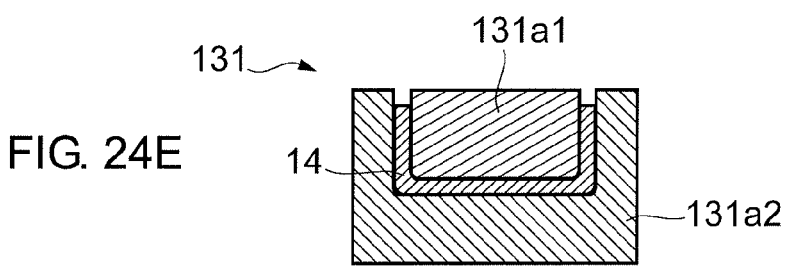
Figure 24F:
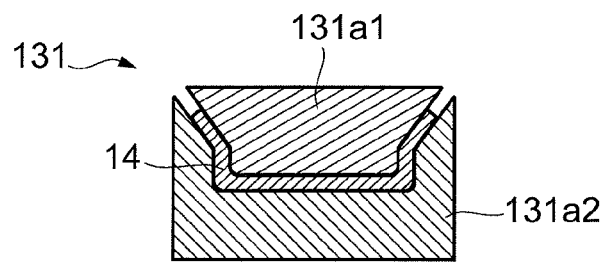
Figure 24G:
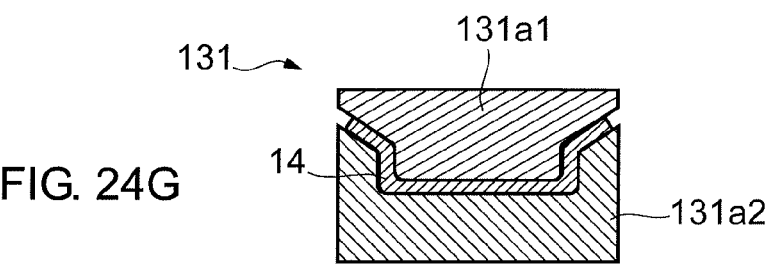
Figure 24H:
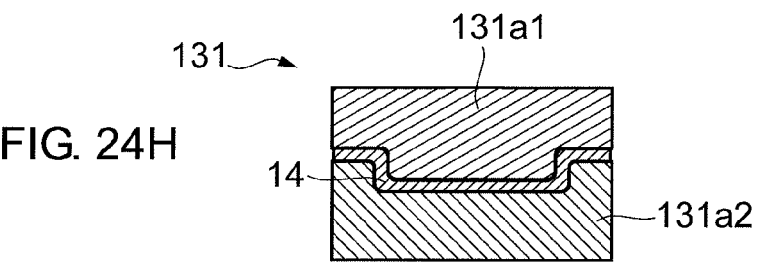

FIG. 24A is a side view of a mold apparatus 131 provided instead of the molding units 15 to 17, and illustrates the case where the target shape is the U-shape. FIG. 24B to 24E are the XXIVB-XXIVB arrow view, the cross-sectional view taken along the line XXIVC-XXIVC, the cross-sectional view taken along the line XXIVD-XXIVD, and the cross-sectional view taken along the line XXIVE-XXIVE in FIG. 24A, respectively. Since a configuration of the mold apparatus 131 when the target shape is the U-shape is similar to that when the target shape is the L-shape, its description is omitted. Even when the target shape is another shape, a mold apparatus as a molding unit may be provided instead of the molding units 15 to 17 or 15 to 17B. A configuration of this mold apparatus is similar to that described above. For example, when the target shape is a hat shape, the mold apparatus 131 in FIG. 24A includes a downstream part on a downstream side of the cross section at the line XXIVE-XXIVE. The downstream part includes cross sections that are on planes perpendicular to the feeding direction and whose examples are FIG. 24F to FIG. 24H in this order from an upstream side.

In one example, the mold apparatus provided instead of the molding units 15 to 17 or 15 to 17B may include only one pair of molds, and its molding force generation device may press the mold 131a1 to the mold 131a2 in one direction (in the case of FIG. 23A or FIG. 24A, the down direction in this figure).

REFERENCE SIGNS LIST 1a, 1b, and 1c layered sheet; 2, 2a, 2b, 2c FRP; 3a, 3b, 3c sheet feeding device (reel); 4a, 4b, 4c prepreg sheet; 5 layering device; 5a, 5b layering roller; 6 heating device; 7 shaping mechanism; 8 cooling device; 9 pulling device; 10 FRP continuous molding apparatus; 11 cutting device; 12 thermoplastic resin; 13 reinforcement fiber; 14 sheet layered body; 15, 16, 17 molding unit; 18 to 19, 21 to 24 molding roller; 20 FRP continuous molding apparatus; 21*a*, 22*a*, 23*a*, 24*a* molding surface; 21*b* division roller; 25 heating device; 31 to 36, 41 to 45 molding rollers; 37 mold apparatus; 37*a*1 to 37*a*4 molds; 37*b* molding force generation device; 37*b*1 to 37*b*3 mold pressing device; 38 non-destructive inspection device; 51A, 51B, 51C molding line apparatus; 52 guide mechanism; 53 combining apparatus; 54 mold apparatus; 54*a* to 541 mold; 55, 56 guide device; 55*a* to 55*i* roller; 56*a* roller; 57 combined body; 58 FRP; 61, 62 guide device; 64, 64A, 64B layered body feeding apparatus; 65, 66, 67 molding unit; 68 mold apparatus; 68*a*1 to 68*a*4 mold; 68*b* molding force generation device; 68*b*1 to 68*b*4 mold pressing device; 69 heating device

The invention claimed is:

1. A fiber-reinforced plastic (FRP) continuous molding apparatus that continuously molds an FRP from a plurality of layered sheets, each layered sheet including a plurality of prepreg sheets layered over each other, each prepreg sheet including thermoplastic resin and reinforcement fibers having a fiber orientation, the layered sheets including at least one prepreg sheet having a fiber orientation in a feeding direction and at least one prepreg sheet having a fiber orientation in a direction different from the feeding direction, the FRP continuous molding apparatus comprising:
 a plurality of sheet feeding devices, each including a body on which a respective layered sheet is wound, the plurality of sheet feeding devices continuously feeding out, from the bodies, the plurality of layered sheets in the feeding direction;
 a layering device including a pair of members that sandwich, between the pair of members, the plurality of the layered sheets fed from the plurality of sheet feeding devices to layer the plurality of the layered sheets over each other, and thereby form a sheet layered body;
 a shaping mechanism that molds the sheet layered body into an FRP while the sheet layered body is being transferred in the feeding direction, the FRP having a cross section that is a target shape; and
 a heating device that heats the sheet layered body before or during molding of the sheet layered body performed by the shaping mechanism, or before and during the molding,
 wherein the sheet layered body includes the reinforcement fibers of the at least one prepreg sheet having a fiber orientation in the feeding direction,
 the shaping mechanism includes a mold apparatus including a plurality of dies, the plurality of dies sandwiching the sheet layered body between the plurality of dies in a thickness direction of the sheet layered body, and compress the sheet layered body in the thickness direction,
 a die included in the plurality of dies includes an inner surface by which an end surface of the sheet layered body in a direction perpendicular to the thickness direction of the sheet layered body is restricted when viewed in the feeding direction, or the mold apparatus includes a restriction member by which an end surface of the sheet layered body in the direction perpendicular to the thickness direction of the sheet layered body is restricted when viewed in the feeding direction, and
 in a sectional plane perpendicular to the feeding direction, the mold apparatus restricts an entire outer periphery of the sheet layered body by the plurality of dies, or the plurality of dies and the restriction member.

2. The FRP continuous molding apparatus according to claim 1, wherein the shaping mechanism includes molding surfaces that form a passage region through which the sheet layered body passes, when viewed in the feeding direction, and
 a shape of the passage region viewed in the feeding direction approaches the target shape as a position shifts to a more downstream side.

3. The FRP continuous molding apparatus according to claim 2,
 wherein the shaping mechanism includes a molding unit that sandwiches and molds the sheet layered body, and the mold apparatus provided on a downstream side of the molding unit,
 the molding surfaces of the shaping mechanism include molding surfaces formed by the plurality of dies,
 the FRP continuous molding apparatus comprises a cooling device that causes a cooling medium to flow through a cooling flow path formed inside each of the plurality of dies.

4. The FRP continuous molding apparatus according to claim 3, wherein the molding unit includes a plurality of molding rollers that sandwich the sheet layered body, and
 the molding surfaces of the shaping mechanism further include a molding surface formed by each of the plurality of molding rollers.

5. The FRP continuous molding apparatus according to claim 3, wherein the mold apparatus is a downstream mold apparatus, and the molding unit includes an upstream mold apparatus, and
 the upstream mold apparatus includes a pair of dies that sandwich the sheet layered body.

6. The FRP continuous molding apparatus according to claim 1,
 wherein the plurality of dies form a passage region through which the sheet layered body passes, and
 an area of the passage region formed by molding surfaces of the plurality of dies gradually decreases as a position shifts from an upstream side to a downstream side in the feeding direction.

7. A fiber-reinforced plastic (FRP) continuous molding apparatus that continuously molds an FRP from a plurality of layered sheets, each layered sheet including a plurality of prepreg sheets layered over each other, each prepreg sheet including thermoplastic resin and reinforcement fibers having a fiber orientation, the layered sheets including at least one prepreg sheet having a fiber orientation in a feeding direction and at least one prepreg sheet having a fiber orientation in a direction different from the feeding direction the FRP continuous molding apparatus comprising:
 a plurality of sheet feeding devices, each including a body on which a respective layered sheet is wound, the plurality of sheet feeding devices continuously feeding out, from the bodies, the plurality of layered sheets in the feeding direction;
 a layering device including a pair of members that sandwich, between the pair of members, the plurality of the layered sheets fed from the plurality of sheet feeding devices to layer the plurality of the layered sheets over each other, and thereby form a sheet layered body; and
 a shaping mechanism that molds the sheet layered body into an FRP while the sheet layered body is being transferred in the feeding direction, the FRP having a cross section that is a target shape;
 wherein the sheet layered body includes the reinforcement fibers of the at least one prepreg sheet having a fiber orientation in the feeding direction,
 wherein the shaping mechanism includes a molding unit that sandwiches and molds the sheet layered body, the FRP continuous molding apparatus comprises a plurality of molding line apparatuses, each of the plurality of molding line apparatuses includes: the plurality of sheet feeding devices; the layering device; and the molding unit constituting the shaping mechanism, and the FRP continuous molding apparatus comprises:

a combining apparatus that combines a plurality of the FRPs transferred from the plurality of molding line apparatuses, and thereby forms a combined body having a new cross-sectional shape;

a molding mechanism that molds the combined body into an FRP whose cross-sectional shape is a final target shape; and a heating device that heats the combined body during molding of the combined body performed by the molding mechanism, wherein the molding mechanism includes a mold apparatus, and the mold apparatus includes a plurality of dies and a restriction member, the plurality of dies sandwich the combined body between the plurality of dies in a thickness direction of the combined body, and compress the combined body in the thickness direction of the combined body, the restriction member restricts an end surface of the combined body in a direction perpendicular to the thickness direction of the combined body, when viewed in the feeding direction, and in a sectional plane perpendicular to the feeding direction, the mold apparatus restricts an entire outer periphery of the combined body by the plurality of dies and the restriction member.

8. The FRP continuous molding apparatus according to claim 7, wherein the molding mechanism includes molding surfaces that form a passage region through which the combined body passes, when viewed in the feeding direction, and a shape of the passage region in the molding mechanism viewed in the feeding direction approaches the final target shape as a position shifts to a more downstream side.

9. The FRP continuous molding apparatus according to claim 8, wherein the molding mechanism includes a second molding unit and the mold apparatus provided on a downstream side of the second molding unit of the molding mechanism, the second molding unit of the molding mechanism includes a plurality of molding rollers sandwiching the combined body, the molding surfaces of the molding mechanism includes a molding surface formed by each of the plurality of molding rollers, and molding surfaces formed by the plurality of dies, and the FRP continuous molding apparatus comprises a cooling device that causes a cooling medium to flow through a cooling flow path formed inside each of the plurality of dies of the molding mechanism.

10. The FRP continuous molding apparatus according to claim 7, comprising a layered body feeding apparatus that includes: a plurality of sheet feeding devices each including a body on which a respective layered sheet is wound, the plurality of sheet feeding devices continuously feeding out, from the bodies, a plurality of layered sheets in the feeding direction; and a layering device including a pair of members that sandwich, between the pair of members, the plurality of the layered sheets fed from the plurality of sheet feeding devices in the layered body feeding apparatus to layer the plurality of the layered sheets over each other, and thereby form a sheet layered body, and the combining apparatus combines the plurality of the FRPs and the sheet layered body from the layered body feeding apparatus, and thereby forms the combined body.

11. The FRP continuous molding apparatus according to claim 7, wherein the plurality of dies form a passage region through which the combined body passes, and an area of the passage region formed by molding surfaces of the plurality of dies gradually decreases as a position shifts from an upstream side to a downstream side in the feeding direction.

12. A fiber-reinforced plastic (FRP) continuous molding method for continuously molding an FRP from a plurality of layered sheets, each layered sheet including a plurality of prepreg sheets layered over each other, each prepreg sheet including thermoplastic resin and reinforcement fibers having a fiber orientation, the layered sheets including at least one prepreg sheet having a fiber orientation in a feeding direction and at least one prepreg sheet having a fiber orientation in a direction different from the feeding direction, the FRP continuous molding method comprising:

continuously feeding the plurality of the layered sheets in the feeding direction;

layering, over each other, the plurality of the fed layered sheets, and thereby forming a sheet layered body;

molding the sheet layered body into an FRP while transferring the sheet layered body in the feeding direction, the FRP having a cross section that is a target shape, heating the sheet layered body before or during the molding of the sheet layered body, or before and during the molding of the sheet layered body, the molding of the sheet layered body includes:

sandwiching the sheet layered body between a plurality of dies in a thickness direction of the sheet layered body, and compressing the sheet layered body by the plurality of dies in the thickness direction; and restricting an end surface included in the sheet layered body and located at an end in a direction perpendicular to the thickness direction of the sheet layered body, by an inner surface of a die included in the plurality of dies or by a restriction member, when viewed in the feeding direction, and thereby restricting, in a sectional plane perpendicular to the feeding direction, an entire outer periphery of the sheet layered body by the plurality of dies, or the plurality of dies and the restriction member, wherein the sheet layered body includes the reinforcement fibers of the at least one prepreg sheet having a fiber orientation in the feeding direction.

13. The FRP continuous molding method according to claim 12, wherein the plurality of dies form a passage region through which the sheet layered body passes, and an area of the passage region formed by molding surfaces of the plurality of dies gradually decreases as a position shifts from an upstream side to a downstream side in the feeding direction.

14. An fiber-reinforced plastic (FRP) continuous molding apparatus that continuously molds an FRP from a plurality of layered sheets each including a plurality of prepreg sheets layered over each other, wherein the plurality of prepreg sheets each include thermoplastic resin and reinforcement fibers and differ from each other in fiber orientation, the FRP continuous molding apparatus comprising:

a plurality of sheet feeding devices each including a body on which a respective layered sheet is wound, the plurality of sheet feeding devices continuously feeding out, from the bodies, the plurality of layered sheets in a feeding direction;

a layering device including a pair of members that sandwich, between the pair of members, the plurality of the layered sheets fed from the plurality of sheet feeding devices, layer the plurality of the layered sheets on each other, and thereby form a sheet layered body;

a shaping mechanism that molds the sheet layered body into an FRP while the sheet layered body is being transferred in the feeding direction, the FRP having a cross section that is a target shape; and a heating device that heats the sheet layered body before or during molding of the sheet layered body performed by the shaping mechanism, or before and during the molding, wherein at least one of the plurality of layered sheets includes a prepreg sheet that is included in the plurality of prepreg sheets and whose fiber orientation is the feeding direction, the shaping mechanism includes a mold apparatus including a plurality of dies, the plurality of dies sandwiching the sheet layered body between the plurality of dies in a thickness direction of the sheet layered body, and compress the sheet layered body in the thickness direction, thereby reducing a thickness of the sheet layered body, the plurality of dies is provided on a downstream side of the layering device, and form a passage region through which the sheet layered body passes, an area of the passage region formed by molding surfaces of the plurality of dies gradually decreases as a position shifts from an upstream side to a downstream side in the feeding direction, and the molding surfaces shape a cross section of the sheet layered body into the target shape by passing of the sheet layered body through the passage region.

15. An fiber-reinforced plastic (FRP) continuous molding apparatus that continuously molds an FRP from a plurality of layered sheets each including a plurality of prepreg sheets layered over each other, wherein the plurality of prepreg sheets each include thermoplastic resin and reinforcement fibers and differ from each other in fiber orientation, the FRP continuous molding apparatus comprising:

a plurality of sheet feeding devices each including a body on which a respective layered sheet is wound, the plurality of sheet feeding devices continuously feeding out, from the bodies, the plurality of layered sheets in a feeding direction;

a layering device including a pair of members that sandwich, between the pair of members, the plurality of the layered sheets fed from the plurality of sheet feeding devices, layer the plurality of the layered sheets on each other, and thereby form a sheet layered body; and a shaping mechanism that molds the sheet layered body into an FRP while the sheet layered body is being transferred in the feeding direction, the FRP having a cross section that is a target shape;

wherein at least one of the plurality of layered sheets includes a prepreg sheet that is included in the plurality of prepreg sheets and whose fiber orientation is the feeding direction, wherein the shaping mechanism includes a molding unit that sandwiches and molds the sheet layered body, the FRP continuous molding apparatus comprises a plurality of molding line apparatuses, each of the plurality of molding line apparatuses includes: the plurality of sheet feeding devices; the layering device; and the molding unit constituting the shaping mechanism, and the FRP continuous molding apparatus comprises:

a combining apparatus that combines a plurality of the FRPs transferred from the plurality of molding line apparatuses, and thereby forms a combined body having a new cross-sectional shape;

a molding mechanism that molds the combined body into an FRP whose cross-sectional shape is a final target shape; and a heating device that heats the combined body during molding of the combined body performed by the molding mechanism, wherein the molding mechanism includes a mold apparatus including a plurality of dies, the plurality of dies sandwich the combined body between the plurality of dies in a thickness direction of the combined body, and compress the combined body in the thickness direction of the combined body, thereby reducing a thickness of the combined body the plurality of dies is provided on a downstream side of the combining apparatus, and form a passage region through which the combined body passes, an area of the passage region formed by molding surfaces of the plurality of dies gradually decreases as a position shifts from an upstream side to a downstream side in the feeding direction, and the molding surfaces shape a cross section of the combined body into the final target shape by passing of the combined body through the passage region.

* * * * *